United States Patent
Matsui et al.

(10) Patent No.: US 6,690,319 B2
(45) Date of Patent: Feb. 10, 2004

(54) SCAN TYPE RADAR DEVICE

(75) Inventors: Sadanori Matsui, Kobe (JP); Tokio Shinagawa, Kobe (JP); Masayuki Kishida, Kobe (JP); Daisaku Ono, Kobe (JP)

(73) Assignee: Fujitsu Ten Limited (JP)

(*) Notice: Subject to any disclaimer, the term of this patent is extended or adjusted under 35 U.S.C. 154(b) by 0 days.

(21) Appl. No.: 10/289,912

(22) Filed: Nov. 7, 2002

(65) Prior Publication Data
US 2003/0085835 A1 May 8, 2003

(30) Foreign Application Priority Data

| Nov. 8, 2001 | (JP) | 2001-343177 |
| Dec. 14, 2001 | (JP) | 2001-381831 |

(51) Int. Cl.$^7$ ............................................. G01S 13/93
(52) U.S. Cl. ......................... 342/70; 342/71; 342/72
(58) Field of Search ............................. 342/70, 71, 72, 342/89, 91, 98, 99, 107, 109, 111, 113, 115, 116, 133, 135, 139, 146, 192, 195, 196; 340/903, 435, 436; 701/301

(56) References Cited

U.S. PATENT DOCUMENTS 22

| 6,025,797 A | 2/2000 | Kawai et al. | |
| 6,226,571 B1 | 5/2001 | Kai | |
| 2003/0001771 A1 * | 1/2003 | Ono ........................... | 342/70 |
| 2003/0085835 A1 * | 5/2003 | Matsui et al. .................. | 342/70 |
| 2003/0117312 A1 * | 6/2003 | Nakanishi et al. ............ | 342/70 |
| 2003/0122703 A1 * | 7/2003 | Kishida et al. ................ | 342/70 |
| 2003/0128154 A1 * | 7/2003 | Nakanishi et al. .......... | 342/107 |
| 2003/0128156 A1 * | 7/2003 | Kishida ....................... | 342/195 |
| 2003/0142007 A1 * | 7/2003 | Ono et al. .................... | 342/70 |
| 2003/0156054 A1 * | 8/2003 | Ishii et al. .................... | 342/70 |

FOREIGN PATENT DOCUMENTS

| EP | 0 464 821 A1 | | 1/1992 |
| EP | 0 932 052 A2 | | 7/1999 |
| EP | 0 989 414 A2 | | 3/2000 |
| EP | 1310804 A2 | * | 5/2003 |
| JP | A-06-082551 | | 3/1994 |
| JP | A-08-240660 | | 9/1996 |
| JP | A-08-313626 | | 11/1996 |
| JP | A-09-145833 | | 6/1997 |
| JP | A-09-203780 | | 8/1997 |
| JP | A-10-239436 | | 9/1998 |
| JP | A-11-271429 | | 10/1999 |
| JP | A-11-337635 | | 12/1999 |
| JP | A-2000-019245 | | 1/2000 |
| JP | A-2000-039474 | | 2/2000 |
| JP | A-2000-147103 | | 5/2000 |
| JP | A-2001-013240 | | 1/2001 |
| JP | 2002014165 A | * | 1/2002 |
| JP | 2000065921 A | * | 3/2003 |

OTHER PUBLICATIONS

Kalata, Paul R., "α–β Target Tracking Systems: A Survey", Proceedings of the 1992 American Control Conference, pp. 832–836, Jun. 24–26, 1992.

* cited by examiner

Primary Examiner—John B. Sotomayor
(74) Attorney, Agent, or Firm—Fogg and Associates, LLC; Laura A. Ryan

(57) ABSTRACT

A scan type radar device capable of detecting a lateral position of a target even if a peak showing the lateral position of the target irregularly fluctuates in the lateral direction as well as reducing the mis-pairing. The former is achievable by changing a reference value of the lateral fluctuation of the target when all the past and present target data fluctuate to an extent exceeding the reference value. The latter is achievable by forecasting a representative peak position at this time in both of up-beat and down-beat from the peak position data at the preceding time and carrying out the past-correspondence grouping of the up-beat and the down-beat at this time in the vicinity of the position of the representative peak forecast this time; the pairing being carried out by using the representative peak calculated by the past-correspondence grouping.

33 Claims, 25 Drawing Sheets

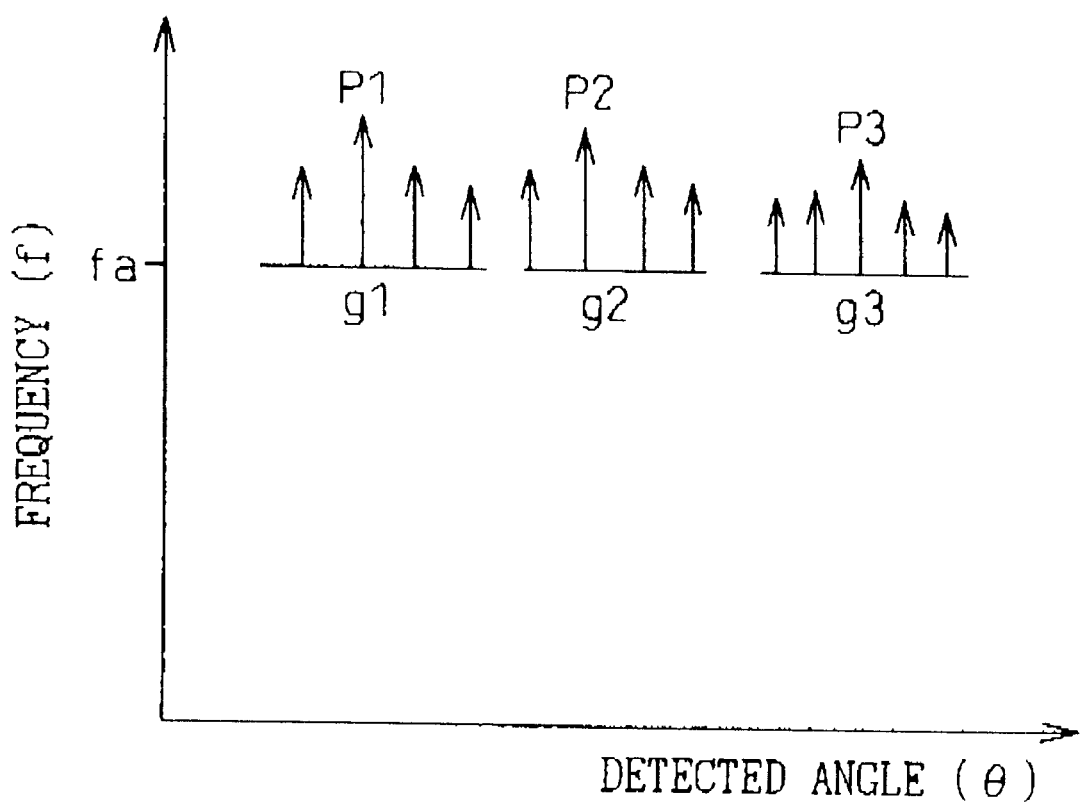

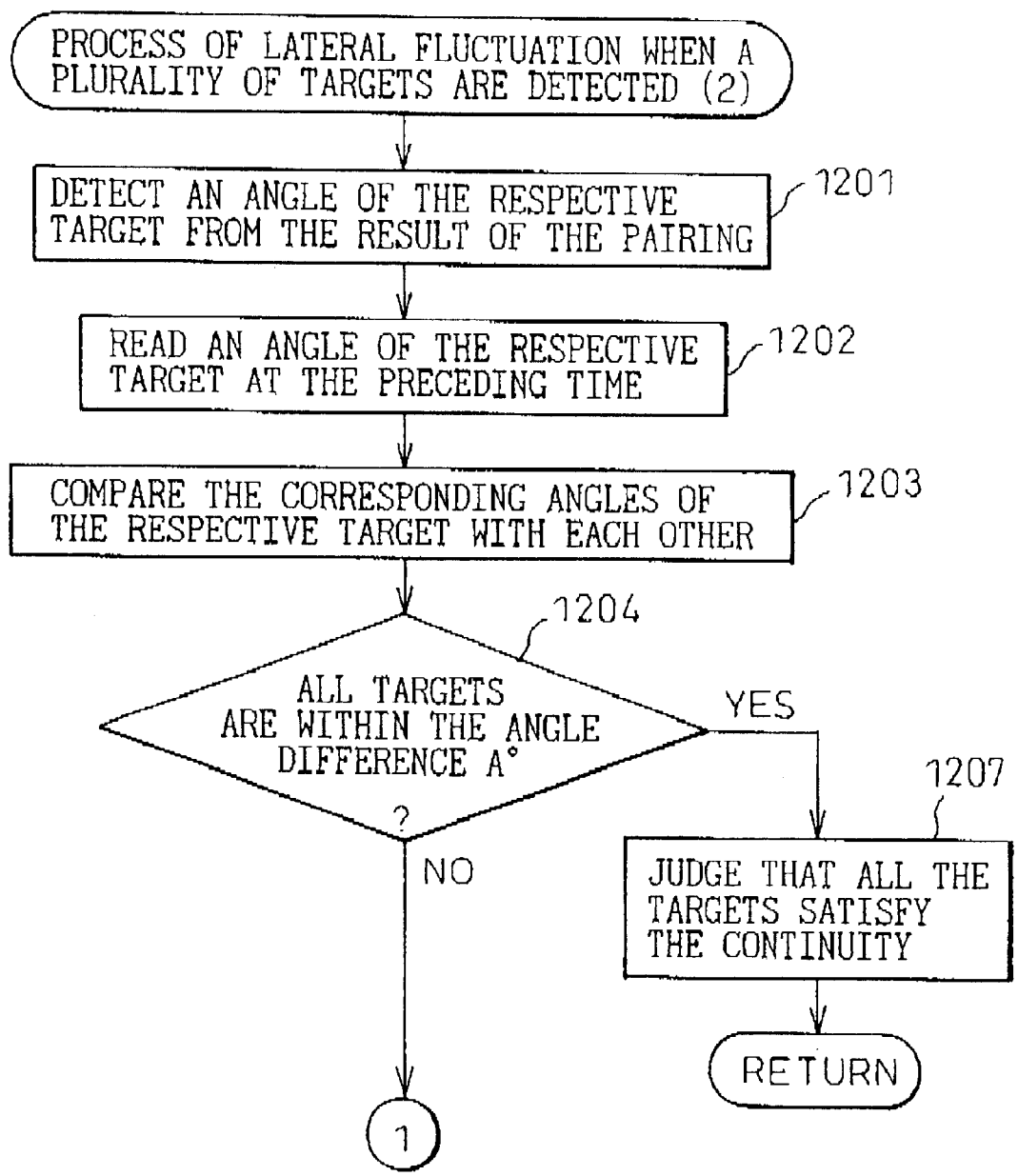

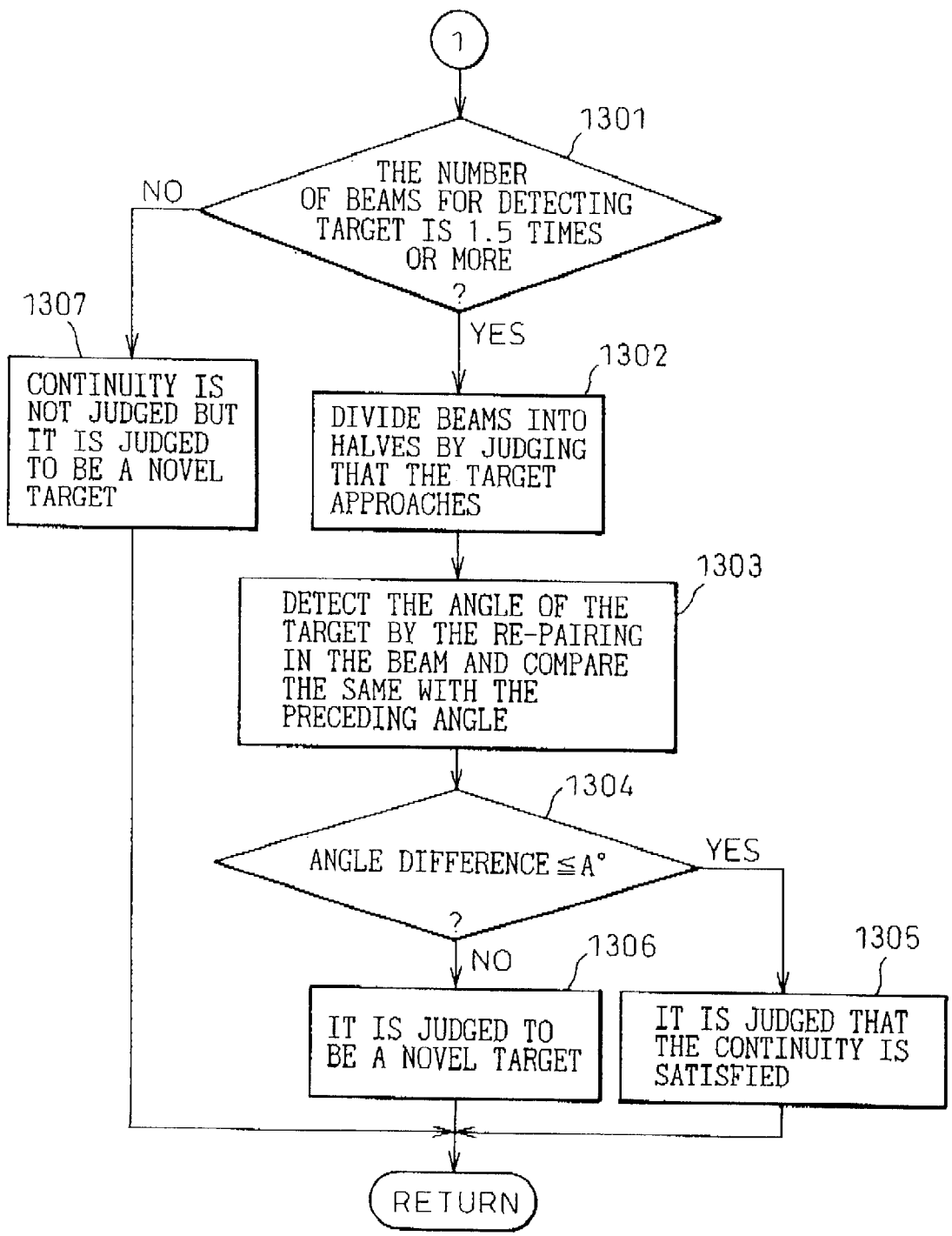

DATA OF THE PRECEDING TIME

DATA OF THIS TIME

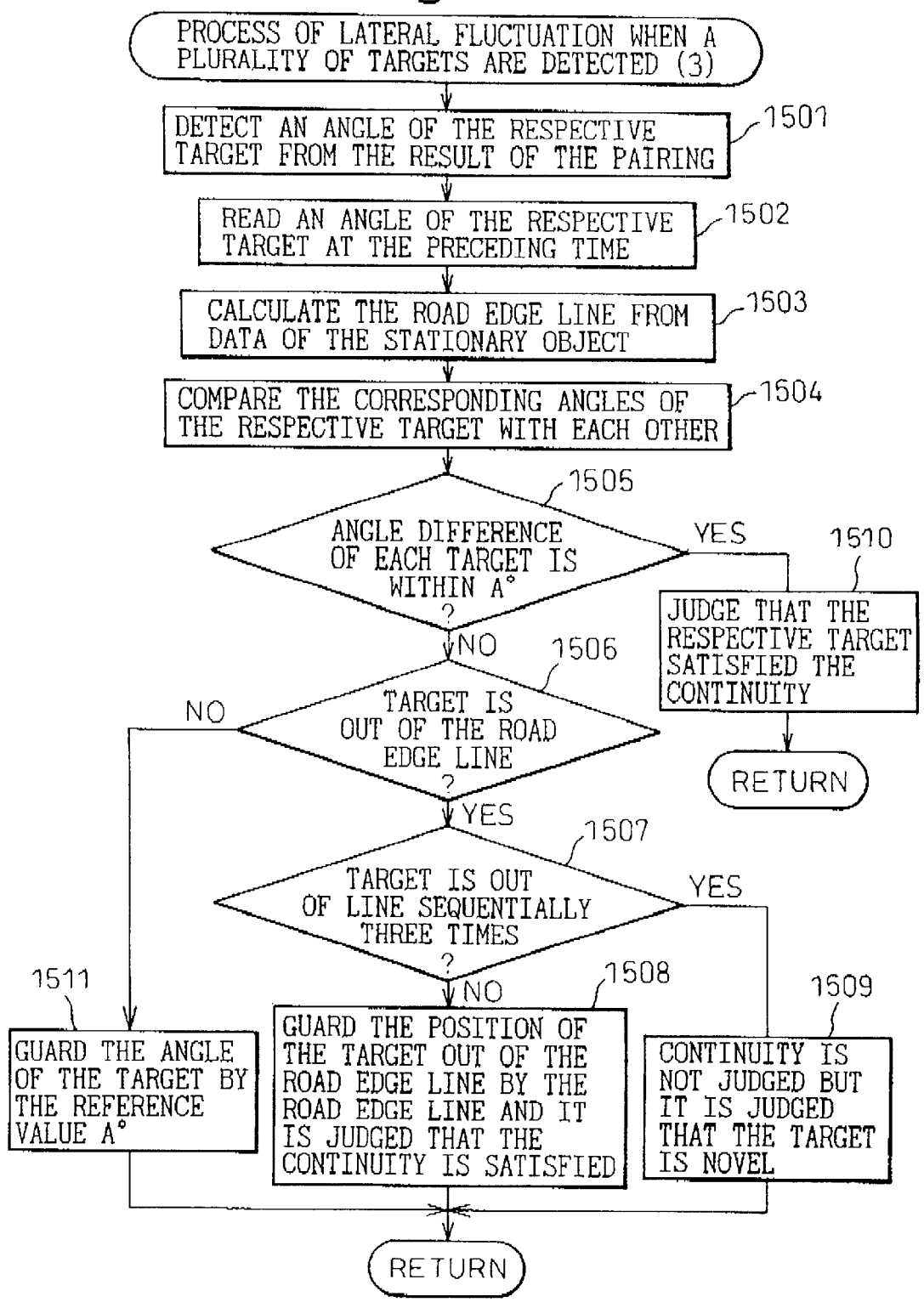

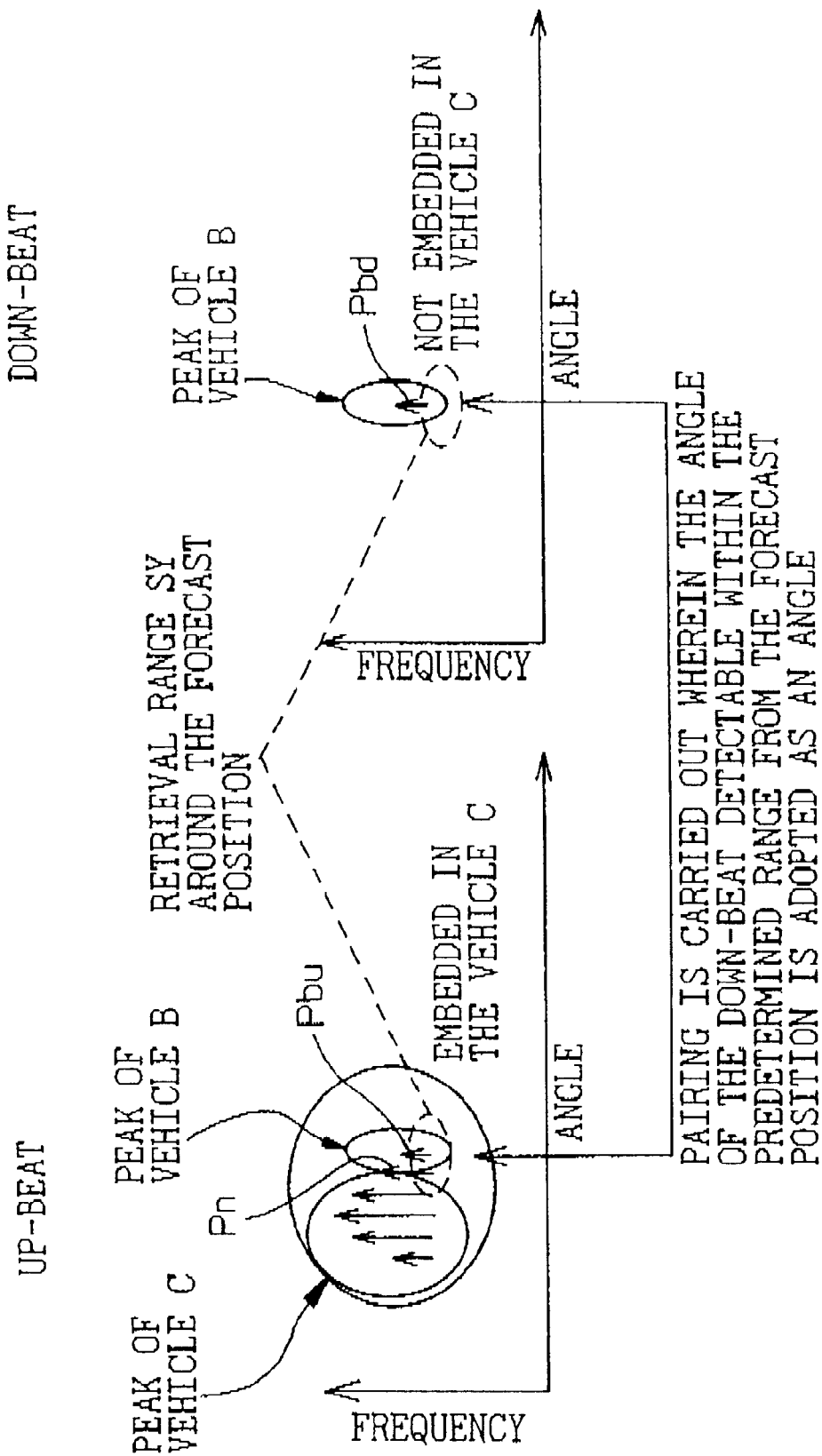

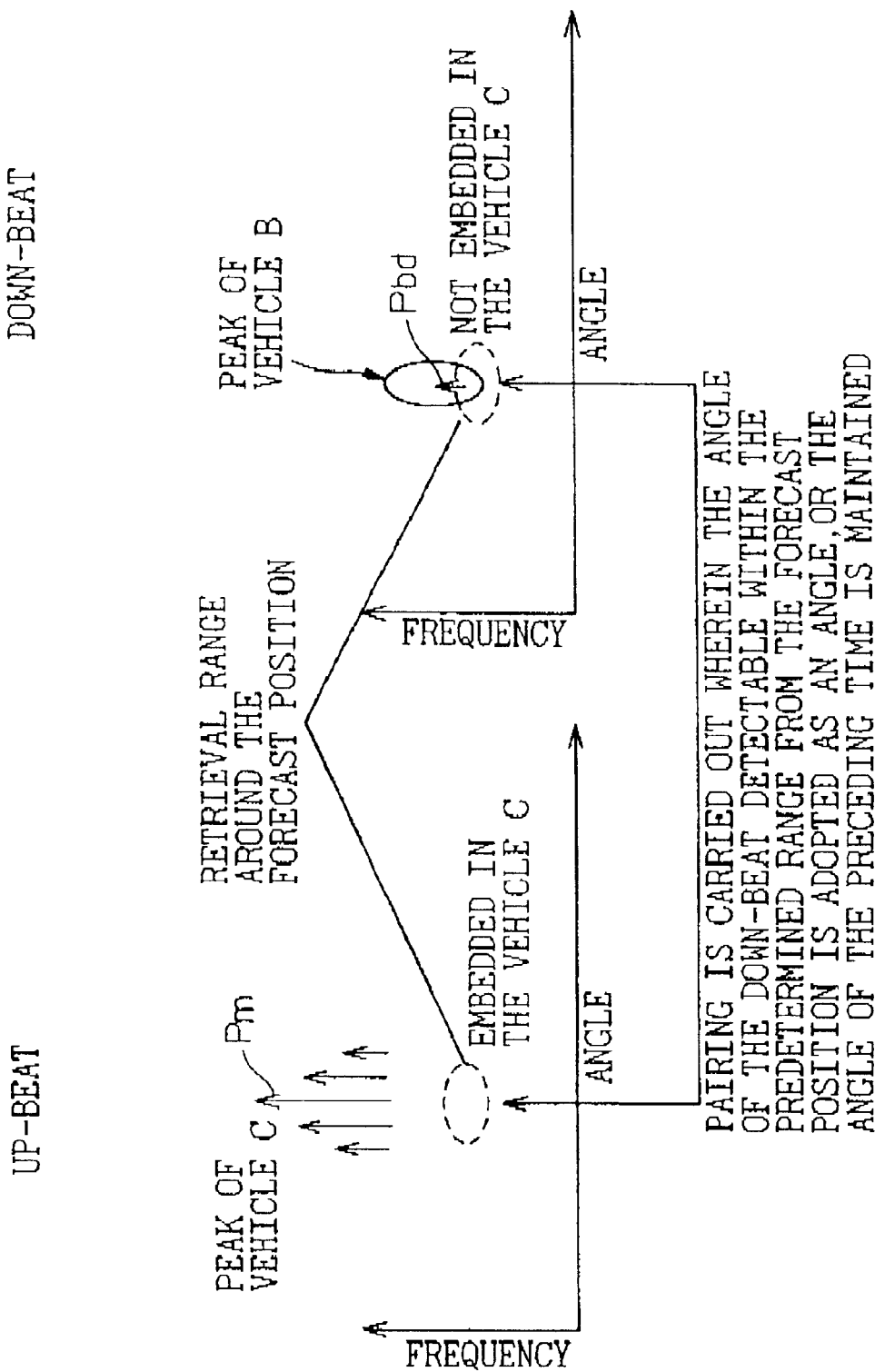

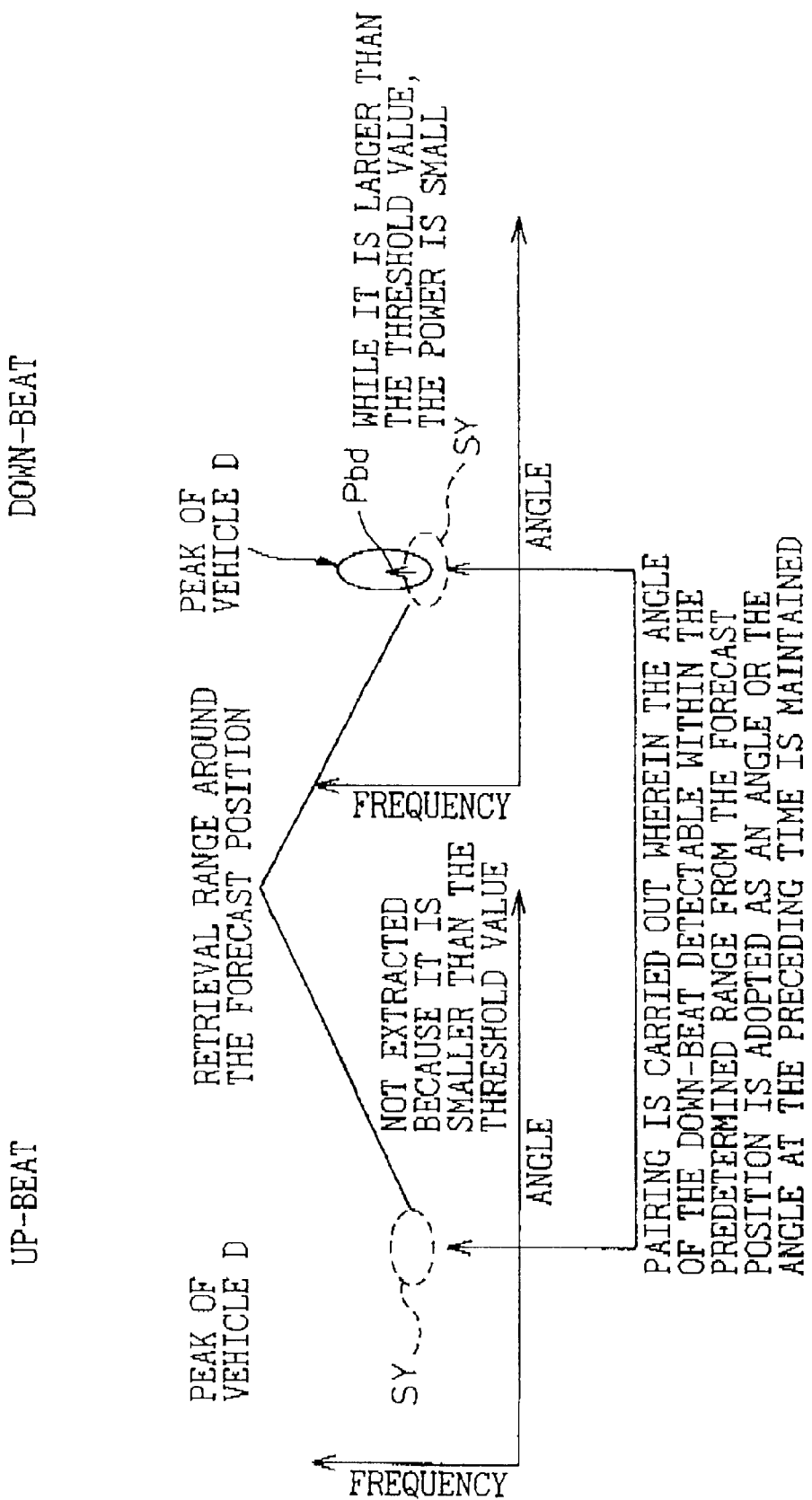

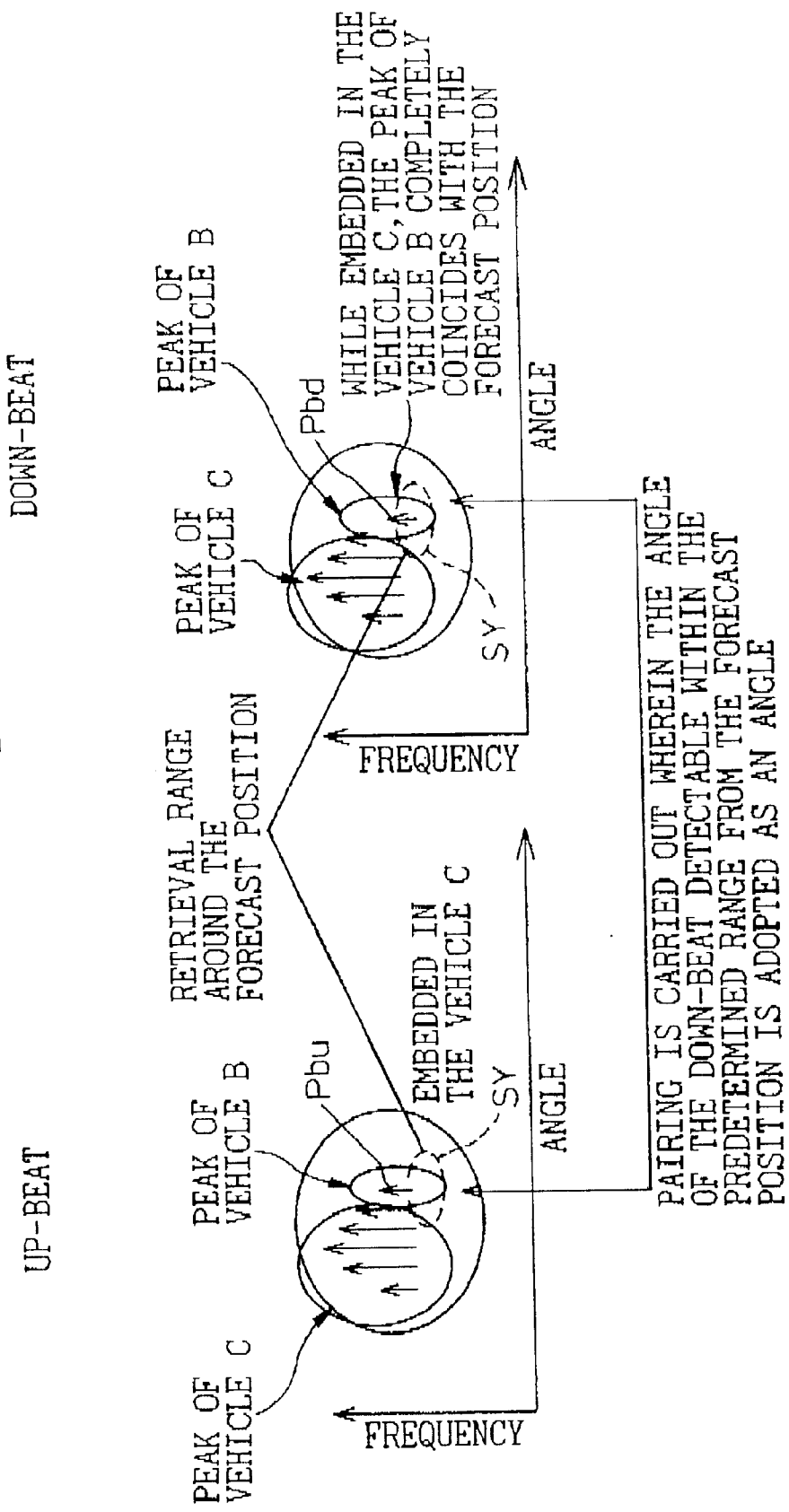

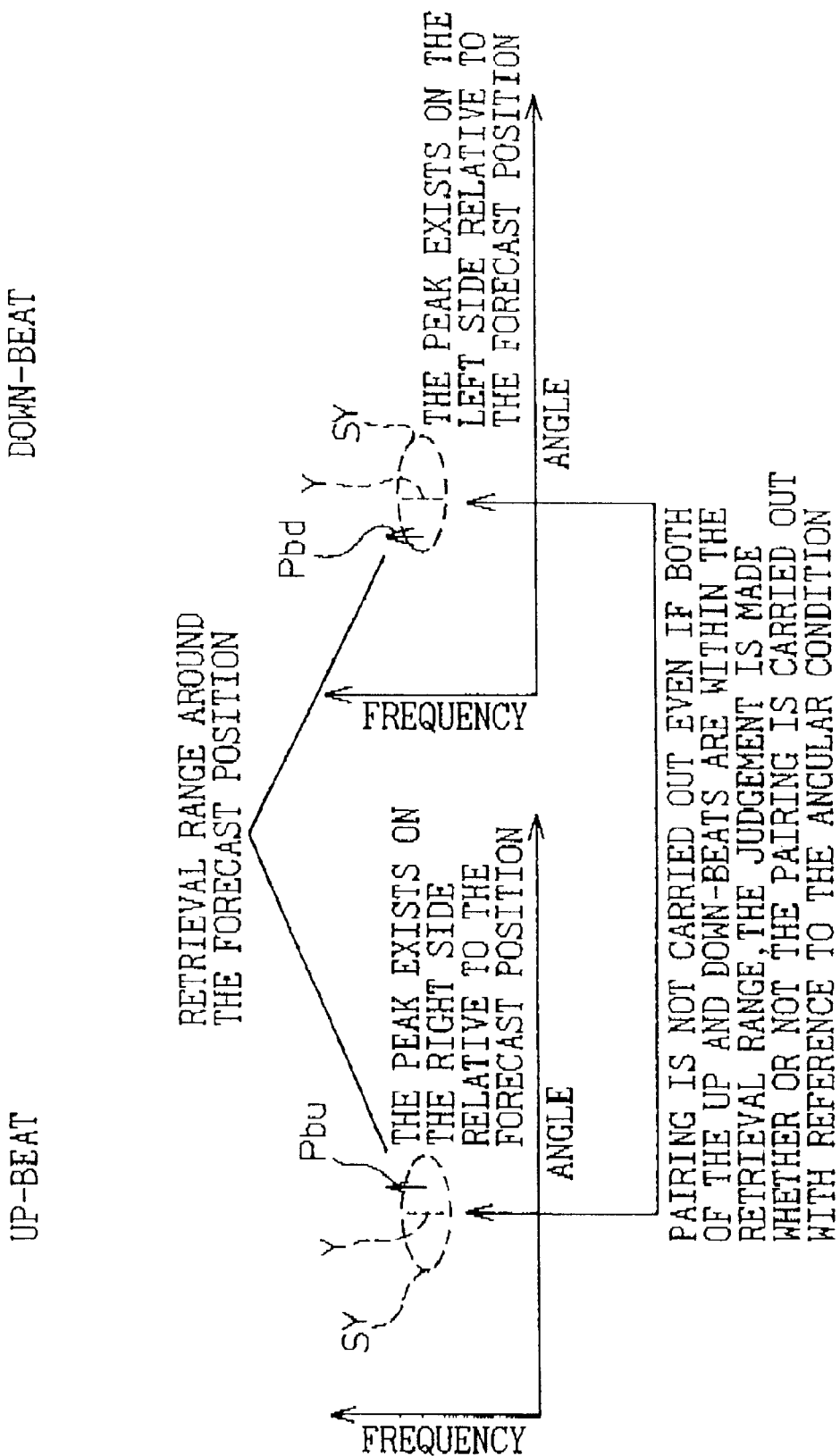

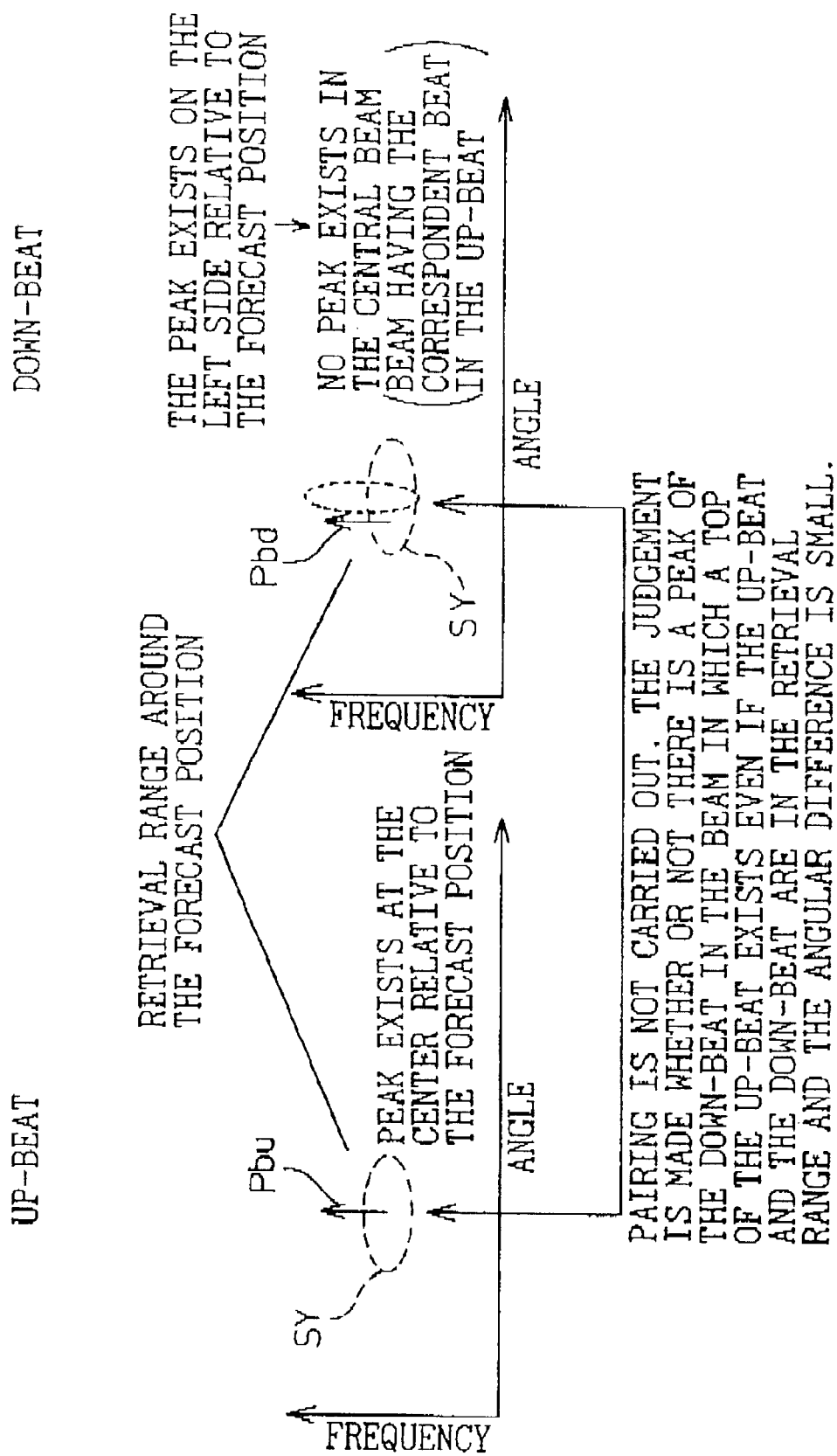

SCAN TYPE RADAR DEVICE

CROSS-REFERENCE TO RELATED APPLICATION

This application claims priority, and incorporates by reference, the entire disclosure of Japanese Patent Applications No. 2001-343177, filed on Nov. 8, 2001, and No. 2001-381831, filed on Dec. 14, 2001.

BACKGROUND OF THE INVENTION

1. Field of the Invention

The present invention relates to a scan type radar device, particularly to an on-vehicle scan type radar device for detecting a target by a beat signal obtained by mixing a transmitted signal with a received signal which is a frequency modulation signal of the transmission signal reflected from an objective such as a car or a stationary objective (hereinafter referred to as a target), wherein the target is accurately acquired by forecasting a detected value to be obtained at this time from a detected value obtained at a preceding time even though the target detected at the front of a host vehicle moves in the lateral direction.

2. Description of the Related Art

Recently, car crash accidents are liable to increase due to a distraction of attention caused by long and monotonous driving, on a highway, of a vehicle. Also, there is a requirement for the automatic running of a vehicle not only at a constant speed by means of a constant speed driving device but also while tracking a preceding vehicle running at the front of a host vehicle.

Under such circumstances, an on-vehicle radar device has been put into practice, which always measures a distance from the preceding vehicle and automatically reduces the running speed of the host vehicle or brakes the host vehicle if the degree of reduction of the distance becomes large, to prevent a car crash, or always monitors positions of a plurality of preceding vehicles to enable the host vehicle to carry out automatic driving.

Such an on-vehicle radar device generally includes an FM-CW (frequency-modulated continuous wave) radar or a pulse drive radar. Among them, the FM-CW radar device provides a base band signal whose frequency changes like a sawtooth waveform (a triangular wave) to a transmission voltage controlled oscillator (VCO), then transmitted forward of the host vehicle from an antenna after being frequency-modulated, receives the signal reflected from a target such as the preceding vehicle by the antenna and mixes the transmitted signal and the received signal to result in a beat signal from which the preceding target is detected.

In this case, the transmitted signal is transmitted as a plurality of beams spaced at a predetermined angle by oscillating (scanning) the antenna in a predetermined angular range forward of the host vehicle. When the lateral position of the target at the front of the host vehicle is detected by using this on-vehicle scan type radar device, in general, peaks of the received signal in the respective beams are gathered to obtain groups of peaks and the lateral position of the one or more targets are calculated based on the maximum peak in each group.

However, there are drawbacks in the above-mentioned scan type on-vehicle radar device as follows:

(1) When two targets are at the front of the host vehicle and positioned side by side in the lateral direction or overlapped with a stationary objective such as a guard rail in the lateral direction, a position of the maximum peak may fluctuate largely. It the lateral position of the target fluctuates largely as described above, the identification of the position of the target becomes difficult and the target may be lost.

(2) When the host vehicle carrying the radar changes its position, for, example, by changing a traffic lane, the lateral position of the target fluctuates largely to cause a loss of continuity in a system wherein the continuity is obtained by tracking data of the target obtained at this time from the past data of the target because the reference value for determining the continuity is definite whereby if the fluctuation exceeds this reference value, the continuity is lost.

(3) When the peak representing the target is overlapped with a stationary objective such as a guard rail or the peak fluctuates in the lateral direction by a multiple reflection from a concrete wall or the like, there may be a case in which the lateral position of the target is outside of the guard rail or the concrete wall to lose the position of the preceding vehicle.

(4) When there is a stationary objective widely spread in the lateral direction at the front of the host vehicle, such as an overbridge, data signal of the target is combined by data signal of the overbridge as if the lateral position of the target largely fluctuates, which may cause the target to be lost.

Also, there are the following problems:

(5) In the FM-CW radar device, pairing is carried out by extracting the respective peaks in the up-beat (beat generated by the mixture of the transmitted beam and the reflected beam when the frequency of the transmitted beam is increasing) and down-beat (beat generated by the mixture of the transmitted beam and the reflected beam when the frequency of the transmitted beam is decreasing) corresponding to each other. If there are a lot of peaks in the same angular direction, the pairing may be carried out between invalid peaks to miss the target.

(6) When the detected target is positioned adjacent to a more reflective target in the lateral direction (angular direction), only one group of peaks is formed in the angular direction whereby the actual peak of the preceding vehicle is embedded in a powerful peak of the other large target and the detection of the peak of the preceding vehicle becomes impossible. As result, the continuity of the target cannot be detected.

(7) When the detected target is positioned adjacent to a more reflective target in the distance direction (frequency changing direction of the rador device), only one group of peaks is formed in the frequency changing direction whereby the actual peak of the preceding vehicle is embedded in a powerful peak of the other large target and the detection of the peak of the preceding vehicle becomes impossible to lose the continuity of the target.

(8) when a target to be detected is a less reflective object such as a motor cycle, a peak is lower than a threshold value of detection to lose the target.

(9) while a correspondence is made between the respective peaks of the up-beat and the down-beat in a certain angular range, in some cases, an invalid pairing is made when the peaks of different objects are detected at the same frequency.

SUMMARY OF THE INVENTION

A first object of the present invention is to solve the problems in the above-mentioned on-vehicle radar device in the prior art and provide a scan type radar device capable of assuredly acquiring the preceding target and detecting the lateral position thereof even though the peak representing the lateral position of the target detected by a plurality of beams irregularly fluctuates in the lateral direction.

A second object of the present invention is to solve the problems in the above-mentioned on-vehicle radar device in the prior art and provide a scan type radar device having a lower risk of mis-pairing, wherein regarding a target previously detected, the position of the target at this time is estimated by the position thereof at the preceding time, and a representative peak is calculated by executing the grouping with the forecast position as a center.

The scan type radar device for achieving the first object is defined by the first to ninth aspects described below.

The first aspect is a radar device for detecting a target by receiving a returned signal reflected from the target, having a reference value of the lateral fluctuation of the target for judging the continuity between past-detected target data and that detected at this time, characterized in that means is provided for changing the reference value in accordance with the movement of the detected target.

The second aspect is a modification of the first aspect that the reference value changing means comprises means for detecting the lateral fluctuation of the target between the past-detected target data and that detected at this time and means for changing the reference value if it is judged that the target moves to exceed the reference value.

The third aspect is a modification of the second aspect that the reference value changing means forms the judgement that the target moves while exceeding the reference value when all the lateral movements show generally identical values exceeding the reference value.

The fourth aspect is a modification of the first aspect by means for detecting the lateral fluctuation of the target between the past-detected target data and that detected at this time and means for restricting the lateral fluctuation of a specific target by a predetermined restriction value when the fluctuation exceeding the reference value occurs in data of the specific target while the fluctuation of other target data is within the reference value.

The fifth aspect is a radar device of the first aspect capable of detecting a stationary objective, characterized by means for detecting the lateral fluctuation of the target between the past-detected target data and that detected at this time, means for setting a road edge line of a road at the front of a vehicle from the detected stationary objective, and means for correcting the lateral fluctuation of the specific target by the road edge line when the fluctuation exceeding the road side line occurs in data of the specific target.

The sixth aspect is a modification of the fifth aspect that the road edge setting means sets the road side line by using the target judged as the stationary objective within a certain reference distance from the host vehicle.

The seventh aspect is a modification of the fifth or sixth aspect that the road side setting means sets the road side line by using a curve information of the road calculated by means for calculating a curve information of the curved road at the front of the host vehicle.

The eighth aspect is a radar device of the first aspect capable of detecting a stationary objective, characterized by means for detecting the lateral fluctuation of the target between the past-detected target data and that detected at this time, means for judging that the target is a specific stationary objective when the target data widely spreads in the lateral direction, and means for limiting the lateral fluctuation of a predetermined target data by a predetermined limit value when the predetermined target data is overlapped with the predetermined stationary objective data.

The ninth aspect is a radar device of the first aspect for transmitting a plurality of beams, receiving a predetermined number of beams reflected from the target and detecting the target from peaks of a predetermined number of beat signals obtained by mixing the transmission signal with the reception signal, characterized by means for detecting the lateral fluctuation of the target between the past-detected target data and that detected at this time and means for limiting the lateral fluctuation of the past target data at this time by a predetermined limit value.

The tenth aspect is a modification of the first aspect that the radar device is an on-vehicle radar device using a millimetric wave. In this regard, any combinations of these first to tenth aspects, of course, constitute the present invention.

The eleventh aspect is a radar device for achieving the above-mentioned second object is a radar device for detecting a target by a beat signal obtained by transmitting a frequency-modulated signal, receiving a signal reflected from the target and mixing these transmission signal and the reception signal, wherein a representative peak is calculated by grouping peak data in an up-beat and a down-beat, respectively, by a grouping means and the target is detected by pairing the representative peaks in the respective grouped beats by a pairing means, characterized in that means for forecasting a representative peak position at this time in both of the up-beat and the down-beat from peak position data at the preceding time, to every target obtained by the pairing, and past-correspondence grouping means for carrying out the grouping in the up-beat and the down-beat in the vicinity of the forecast representative peak position at this time are provided so that the pairing means carries out the pairing by using the representative peaks calculated by the past-correspondence grouping means, The twelfth to twenty-eighth aspects are possible in the present invention.

A twelfth aspect is a modification of the eleventh aspect that the past-correspondence grouping means carries out the grouping of the peak data in the up-beat and the down-beat discrete in the frequency and angular directions, around the representative peak at this time, if any, forecast by the peak position forecasting means, and grouping of the remaining peak data thereafter.

A thirteenth aspect is a modification of the twelfth aspect that when the representative peak at this time is calculated by the past-correspondence grouping means in either one of the up-beat and the down-beat in the vicinity of the forecast position and a peak is detected in the vicinity of the forecast position in the other beat as well as a larger peak is detected at a position shifted in the angular or frequency direction, the past-correspondence means judges that a peak is not embedded in other target in one beat but is judged that a peak is embedded in other target in the other beat.

A fourteenth aspect is a modification of the thirteenth aspect that when a level of the peak in the other beat shifted in the angular or frequency direction from the forecast position is larger than a level of the representative peak at this time in the vicinity of the forecast position in the one beat, the past-correspondence grouping means carries out the past-correspondence grouping process.

A fifteenth aspect is a modification of the thirteenth or fourteenth aspect that the past-correspondence grouping means makes an angle or frequency of a peak calculated as the representative peak in the past-correspondence grouping process to be equal to the angle of the representative peak at this time calculated in the beat judged to be not embedded.

A sixteenth aspect is a modification of the thirteenth aspect that when the past-correspondence grouping means carried out the retrieval of a peak in the other beat larger than the peak detected in the vicinity of the forecast position in the direction shifted in the frequency direction, the frequency retrieval range is variable in accordance with the difference in power between this peak and the representative peak calculated in the one beat.

A seventeenth aspect is a modification of the sixteen aspect that means for measuring a reflection level of the reflected signal is provided and when the reflection level of the reception signal in one beat is higher than the reflection level of the reception signal in the other beat, the past-correspondence grouping means carries out the past-correspondence grouping process.

A eighteenth aspect is a modification of the seventeenth aspect that when an absolute value of the reflection level of a larger peak detected in the direction shifted in the frequency direction relative to a peak detected in the vicinity of the forecast position exceeds a predetermined threshold value, the past-correspondence grouping means carries out the past-correspondence grouping process.

A nineteenth aspect is a modification of the seventeenth or eighteenth aspect that the past-correspondence grouping means makes an angle of the peak calculated as a representative peak in the past-correspondence grouping process to be equal to an angle of a representative peak calculated at this time in one beat.

A twentieth aspect is a modification of the seventeenth or eighteenth aspect that the past-correspondence grouping means maintains an angle of the representative peak at the preceding time and uses as an angle of a peak to be calculated as a representative peak in the past-correspondence grouping process.

A 21st aspect is a modification of the twelfth aspect that when a peak having a smaller power corresponding to a representative peak at this time is detected in the vicinity of the forecast position in either one of up-beat and down-beat by the past-correspondence grouping means, but no peak is detected in the vicinity of the forecast position in the other beat, the past-correspondence grouping means carries out an imaginary grouping process for calculating an imaginary representative peak at the same position in the other beat as that of a representative peak in the one beat, and the pairing means carries out the pairing by using the representative peak and the imaginary representative peak calculated by the past-correspondence grouping means.

A 22nd aspect is a modification of the 21st aspect that the past-correspondence grouping means carries out the imaginary grouping process solely when the position of the peak having a small power is within a predetermined range at the front of the vehicle.

A 23rd aspect is a modification of the 21st aspect that the past-correspondence grouping means carries out the imaginary grouping process when the position of the peak having a small power completely coincides with the forecast value at this time.

A 24th aspect is a modification of the twelfth aspect that when the representative peak at this time is calculated at a position completely coinciding with the forecast position in the beat in either one of the up-beat and the down-beat by the past-correspondence grouping means, the pairing means carries out the pairing by solely using the completely coincided peak in the one beat at this time irrespective of the result of the grouping by the past-correspondence grouping means in both of the beats.

A 25th aspect is a modification of the twelfth aspect that when there is the difference exceeding a reference value in the angular direction or the frequency direction between the representative peak at this time calculated in the vicinity of the forecast position in one of the up-beat and the down-beat and the representative peak at this time calculated in the vicinity of the forecast position in the other beat, the pairing means removes the both from the pairing objects.

A 26th aspect is a modification of the twelfth aspect that when the representative peak at this time is calculated in the vicinity of the forecast position in either one of the up-beat and the down-beat by the past-correspondence grouping means and a peak is detected at a position shifted from the forecast position in the angular or frequency direction in the other beat but not detected in the vicinity of the forecast position, the pairing means removes the representative beat at this time from the pairing object.

A 27th aspect is a modification of the twelfth aspect that when the calculation of the representative peak at this time in the vicinity of the forecast position by the past-correspondence grouping means is interrupted, the past-correspondence grouping means repeats the calculation of the representative peak at this time in the vicinity of the forecast position a predetermined times.

A 28th aspect is a modification of the twelfth or 27th aspect that when the calculation of the representative peak at this time in the vicinity of the forecast position by the past-correspondence grouping means is interrupted, the past-correspondence grouping means calculates the representative peak at this time by widening a range in the vicinity of the forecast position in the angular or frequency direction in accordance with a length of the interrupted time.

According to the above-mentioned first to ninth aspects and the possible combinations thereof, the following actions are obtained:

(1) Even if two targets running at the front of the host vehicle are arranged side-by-side or overlapped with a peak of the stationary objective such as a guard rail in the lateral direction, it is possible to identify a position of the target and not to lose the target.

(2) Even if the host vehicle changes a position thereof, for example, by changing traffic lanes, since the reference value for judging the target is changed so that the continuity of the target is obtained, the target is not lost.

(3) Even if the peak of the target is overlapped with the peak of the stationary objective such as a guard rail or the peak is shifted in the lateral direction caused by the multiple-reflection from a concrete wall or others, the position of the preceding vehicle is not missed.

(4) Even if a stationary objective widely spread in the lateral direction such as an overbridge exists at the front of the vehicle, the target is not missed.

Also, according to the above-mentioned eleventh to 28th aspects and the possible combinations thereof, the following actions are obtained:

(5) Regarding the target detected once by the pairing when a number of peaks exist in the same frequency direction and judged that the existence thereof is certainly reliable, the pairing is carried out after the position of the target at this time is forecast from the preceding position and the grouping around the forecast position is carried out, whereby it is possible to suppress the generation of the mis-pairing.

(6) Even if the peak of the preceding target is embedded in the peak of the other large target in the angular direction, it is possible to judge the continuity of the target since the judgement is made that the target exists, if the present correspondence of the peak of the preceding target is judged from the past data in the up-beat or the down-beat.

(7) Even if the peak of the preceding target is embedded in the peak of the other large target in the frequency direction, it is possible to judge the continuity of the target as the judgement is made that the target exists, if the present correspondence of the peak of the preceding target is judged from the past data in the up-beat or the down-beat.

(8) Even if the target is small and the reflection thereof is also small, the possibility for losing the target is reduced because it is judged that the target exists if the present correspondence of the peak of the preceding target in either one of the up-beat and the down-beat is can be taken.

(9) Since the judgement is finally made that whether or not it is the same target from the arrangement of the peaks when the correspondence between the respective peaks in the up-beat and the down-beat is judged, it is possible to reduce the possibility of mis-pairing of different objectives.

BRIEF DESCRIPTION OF THE DRAWINGS

The present invention will be more clearly understood from the description as set forth below with reference to the accompanying drawings, wherein:

FIGS. 2A to 2C are characteristic diagrams wherein FIG. 2A is a wave shape diagram illustrating the change with time of a transmitting wave and a receiving wave in the millimetric wave radar device of FIG. 1 when a relative speed to a target is V, FIG. 2B is a wave shape diagram illustrating the change of the frequency of the transmitting wave, and FIG. 2C is a wave shape diagram representing the generation of beat with time, which is a shift in frequency between the transmission and reception signals of FIG. 2A;

FIG. 3 is a graph illustrating a detection angle-frequency characteristic when three targets exist at the front of a host vehicle, for explaining the grouping in a microprocessor;

FIGS. 5A and 5B illustrate maps of up/down-beats signals when sixteen beams are irradiated in front of the host vehicle wherein FIG. 5A is a map illustrating the up-beat signals of the respective beams and FIG. 5B is a map illustrating the down-beat signals of the respective beams;

FIGS. 6A and 6B illustrate maps of up/down-beats signals after the beat signals in FIGS. 5A and 5B are grouped by the microprocessor wherein FIG. 6A is a map solely illustrating peaks of the up-beat and FIG. 6B is a map solely illustrating peaks of the down-beat;

FIGS. 8A to 8D illustrate various running states on a three-lane road wherein FIG. 8A illustrates a state in which two preceding vehicles run at the front of the host vehicle; FIG. 8B illustrates a state in which one of the preceding vehicles in FIG. 8A change its traffic lane; FIG. 8C illustrates a state in which the host vehicle changes its traffic lane from the state shown FIG. 8A, and FIG. 8D illustrates a state in which the two preceding vehicles run in a side-by-side from the state shown in FIG. 8A;

FIGS. 10A and 10B are a flow chart for processing the lateral fluctuation when a plurality of targets shown in a second embodiment of the present invention are detected;

FIGS. 11A to 11C illustrate the operation of the radar device according to the present invention on a traffic lane having a guard rail wherein FIG. 11A illustrates a state in which the host vehicle runs behind the preceding vehicle on the traffic lane having the guard rail; FIG. 11B illustrates the detected position of the preceding vehicle when the multiple reflection generates in the state shown in FIG. 11A, and FIG. 11C illustrates a detected range of a stationary objective in the lateral direction of the host vehicle;

FIG. 12 is a flow chart for processing the lateral fluctuation when a plurality of targets shown in a third embodiment of the present invention are detected;

FIG. 19 illustrates the pairing in the fifth embodiment;

FIGS. 20A and 20B illustrate a sixth embodiment according to the present invention wherein FIG. 20A is a positional-relationship diagram for explaining the running state of the host vehicle and a plurality of targets, and FIG. 20B illustrates the reflection characteristic of the up-beat or the down-beat from the targets in the state of FIG. 20A;

FIG. 22 illustrates the pairing in the sixth embodiment;

FIGS. 23A and 23B illustrates a seventh embodiment according to the present invention wherein FIG. 23A is a positional relationship diagram for explaining the running state of the host vehicle and a small target, and FIG. 23B illustrates the reflection characteristic of the up-beat or the down-beat from the targets in the state of FIG. 23A;

FIG. 24 illustrates the pairing in the seventh embodiment;

FIG. 25 illustrates the pairing in an eighth embodiment;

FIG. 26 illustrates the pairing in a ninth embodiment; and

FIG. 27 illustrates the pairing in a tenth embodiment;

DESCRIPTION OF THE PREFERRED EMBODIMENTS

Figure 1:
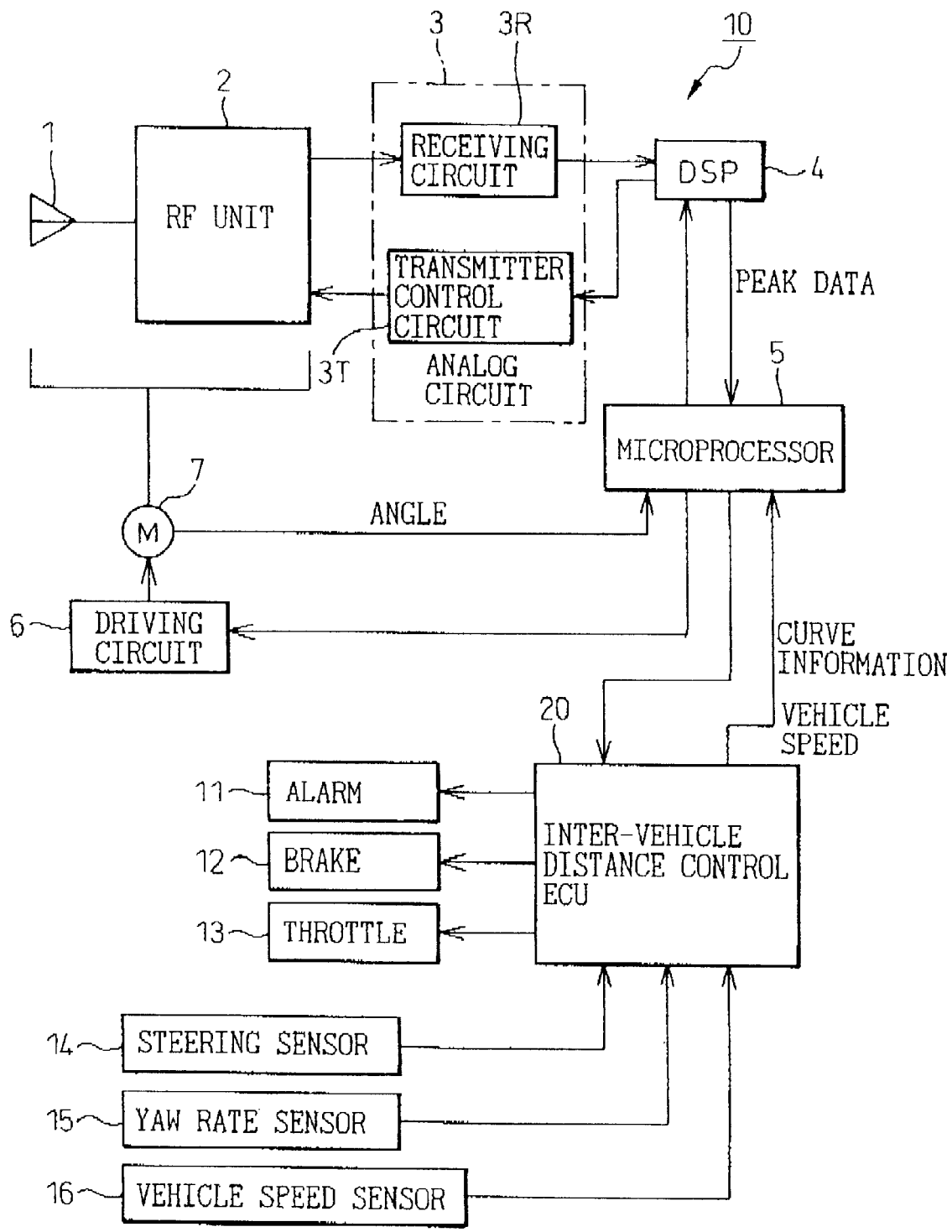
FIG. 1 illustrates an entire structure of a millimetric wave radar device which is a radar device according to the present invention.

The aspects of the present invention will be described in more detail below based on concrete embodiments shown in the attached drawings. As a radar device, a scanning type on-vehicle radar device is explained in this specification FIG. 1 illustrates an entire structure of the on-vehicle millimetric wave radar device 10 which is the radar device of the present invention. In the millimetric wave radar device 10, a transmission signal is modulated in a circuit in a millimetric wave RF unit 2 by a signal of an triangular wave or the like having a modulation frequency Δf issued from a transmitter control circuit 3T incorporated in an analog circuit 3 and converted to a millimetric wave which then is irradiated forward from a host vehicle via an antenna 1. The millimetric wave reflected and returned from a target at the front of the host vehicle is received by the antenna 1 and fed to a mixer (not shown) in the millimetric RF unit 2. As part of the transmission signal is input to the mixer, a signal corresponding to a distance from the target and a relative speed is obtained as a beat signal. This beat signal is transmitted to DSP (digital signal processor) 4 via a reception circuit 3R incorporated in the analog circuit 3.

In DPS 4, a frequency analysis of the beat signal is carried out in DSP 4 by FFT (fast Fourier transform) analysis to determine which frequency band contains a component of the beat signal. The frequency-analysed beat signal creates a peak having a large power for the target. A frequency corresponding to this peak is referred to as a peak frequency. The peak frequency is transmitted to a microprocessor 5 as peak data. The peak frequency has information regarding the distance. The peak frequency when the frequency of the transmitting wave rises is different from that when the frequency of the transmitting wave falls. The microprocessor 5 calculates the distance and the speed of the front target based on the peak frequencies when the frequency of the transmitting wave rises and falls.

Since a vehicle running at the front of the host vehicle is only detectable if the antenna 1 faces the front, the antenna 1 swings (scans) rightward and leftward by a motor 7. A swing angle of the antenna 1 by the motor 7 is approximately 10 degrees in the leftward direction and the rightward direction, respectively, for example, 8 degrees, assuming that the front of the host vehicle is 0 degree. A plurality of beams of the millimetric wave are irradiated from the antenna 1 at a predetermined angle within this range of 16 degrees.

An ECU (electronic control unit) 20 for controlling a distance between vehicles is connected to the microprocessor 5. An alarm 11, a brake 12 and a throttle valve 13 are connected to the ECU 20 for controlling a distance between vehicles to control the operations of these devices in accordance with the distance from the target (the preceding vehicle) and the relative speed thereto. For example, when the distance from the preceding vehicle becomes shorter than a predetermined value, the alarm 11 is sounded to notify the driver or the brake 12 is operated or the throttle valve 13 is adjusted to lower the rotational speed of the engine.

Also, a steering sensor 14 for detecting a steering angle of a steering wheel, a yaw rate sensor 15 and a vehicle speed sensor 16 are connected to the microprocessor 5 for the purpose of obtaining information of the curvature of a road described later. In this regard, it is unnecessary to provide both of the steering sensor 14 and the yaw rate sensor 15, but either one of them may be provided.

Figures 2A, 2B, 2C:
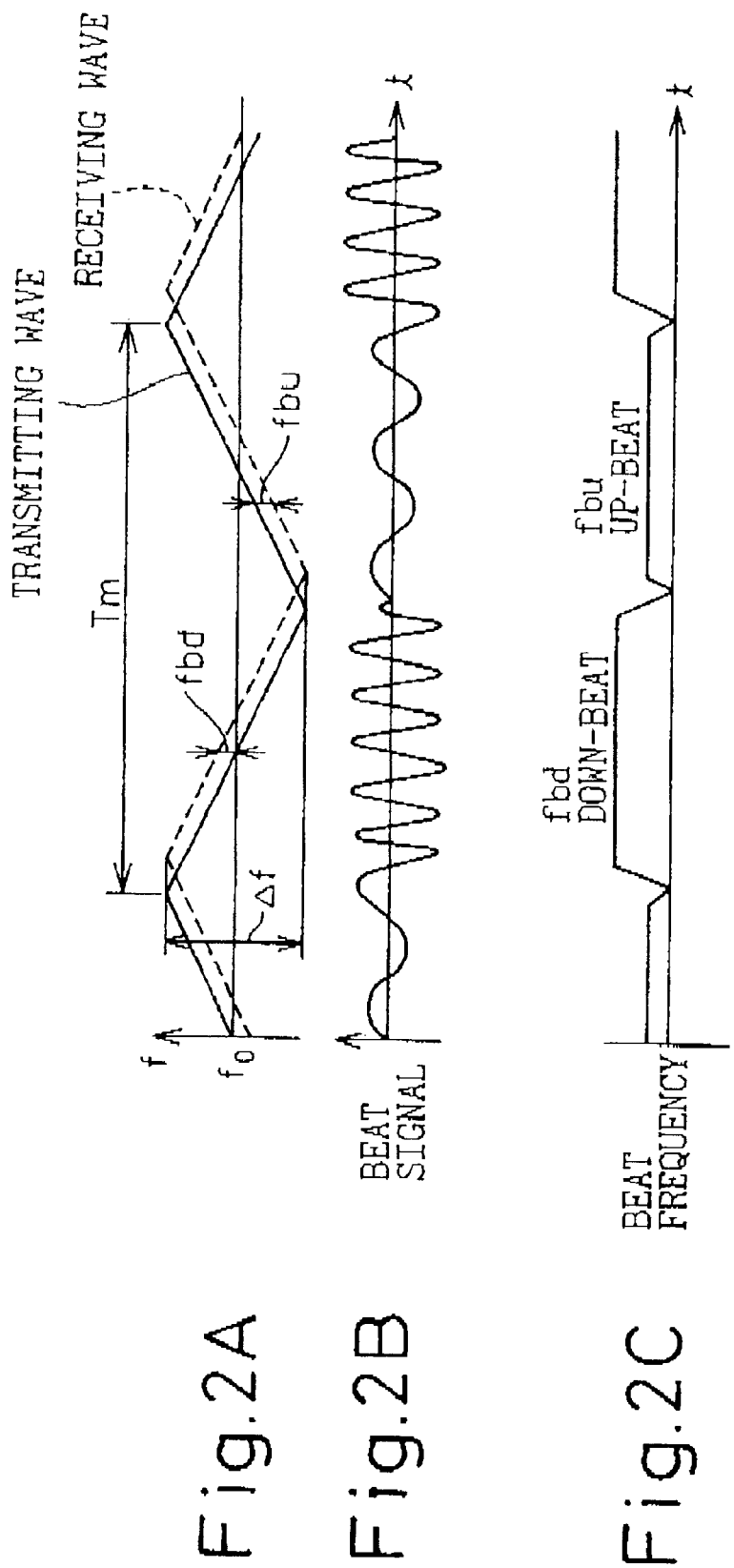

FIGS. 2A to 2C illustrate a principle of the millimetric radar device 10 when the target approaches at a relative speed V. As shown in FIG. 2A by a solid line, the transmitting wave is a triangular wave having a changing frequency. A central frequency of the transmission frequency is f0, a width of FM modulation is Δf and a repetitive period is Tm. This transmitting wave is reflected from the target and received by the antenna 1 as a reception signal shown by a broken line. The mixture of the received signal and the transmission signal generates a frequency shift (beat) in accordance with a distance from the target. In this case, since there is a relative speed V between the host vehicle and the target, the frequency of the beat signal is such as shown in FIGS. 2B and 2C. That is, a frequency difference fbu from the up-beat in which the frequency of the transmitting wave rises is smaller than a frequency difference fbd from the down-beat in which the frequency of the transmitting wave falls. In this regard, when the relative speed to the target is zero, the frequency of the beat signal is the same between the up-beat and the down-beat.

When a plurality of targets exist at the front of the host vehicle, there are a plurality of peak frequencies caused by the up-beat and the down-beat for the respective target because it reflects a plurality of beams. The microprocessor 5 carries out the grouping in each of the up-beat and the down-beat by using, as a center, the highest peak in the peaks having the same frequency in the plurality of peak frequencies. For example, if there are three targets at the front of the host target, a graph is obtained by the reflected waves of the beams as shown in FIG. 3, representing the detected angle-frequency characteristic of the beat signals. A beat signal having the largest power in these beat signals is referred to as a peak, and the microprocessor 5 carries out the grouping of peaks having the same frequency fa, wherein a group g1 has a peak P1, a group g2 has a peak P2 and a group P3 has a peak P3. The peak frequency may not be accurately identical but may be approximately identical.

After the grouping, the microprocessor carries out a one-to-one pairing in which a target obtained by the grouping in the up-beat and a target obtained by the grouping in the down-beat are paired together. A distance from the target is calculated from a sum of the two peak frequencies and a relative speed is calculated from a difference therebetween. Also, the microprocessor 5 forecasts a position (distance) of the next target by judging the continuity of the respective targets based on data of the position and the relative speed of the respective targets obtained at a predetermined period.

An outline of one embodiment of a method for recognizing a target running at the front of the host vehicle will be explained based on a flow chart shown in FIG. 4 and actually obtained data shown in FIGS. 5 to 10. A process shown in FIG. 4 is carried out every time the antenna scans forward.

Figure 4:
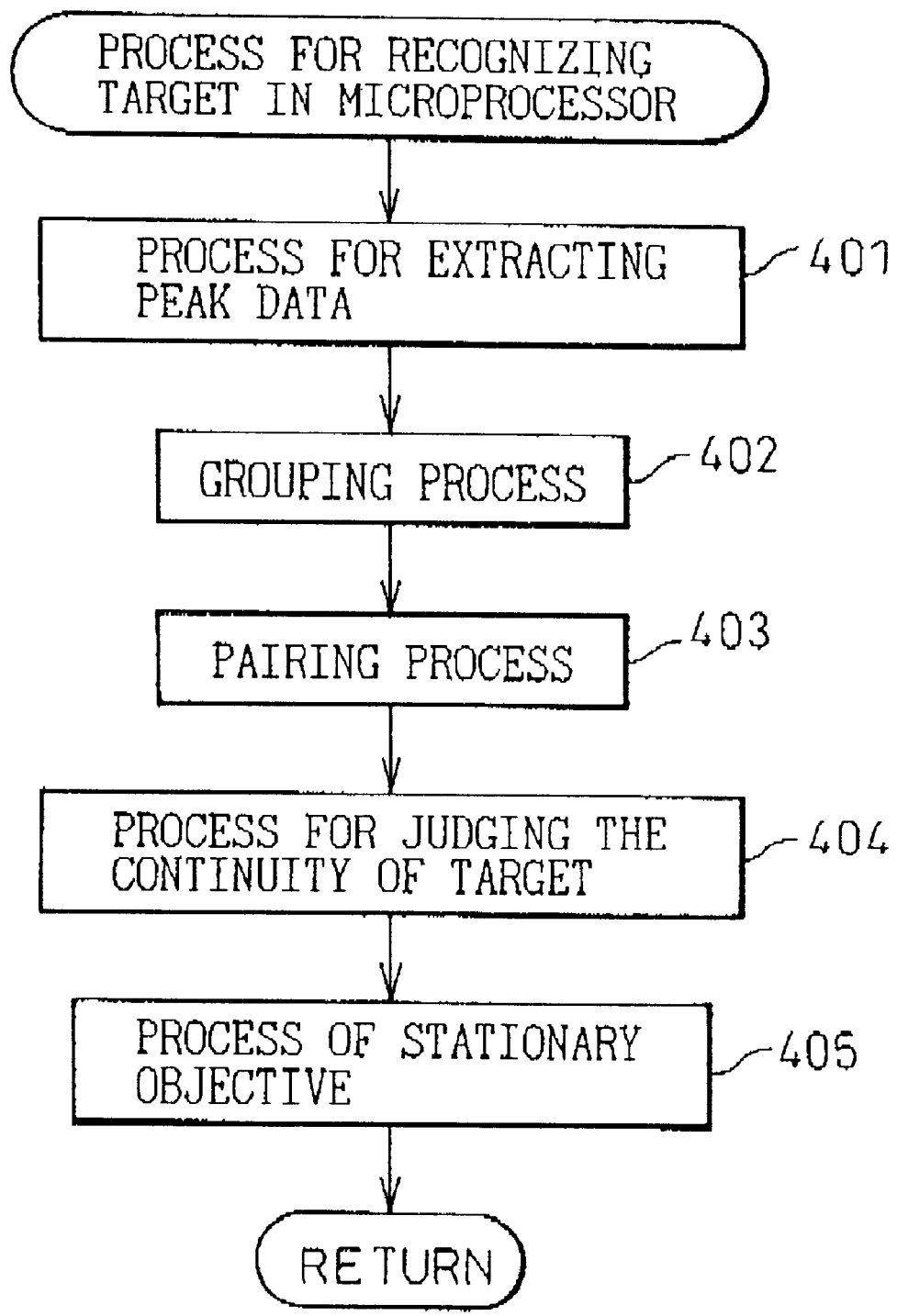
FIG. 4 is a flow chart illustrating one example of a process for recognizing a target in a microprocessor according to the present invention.
Figure 5A:
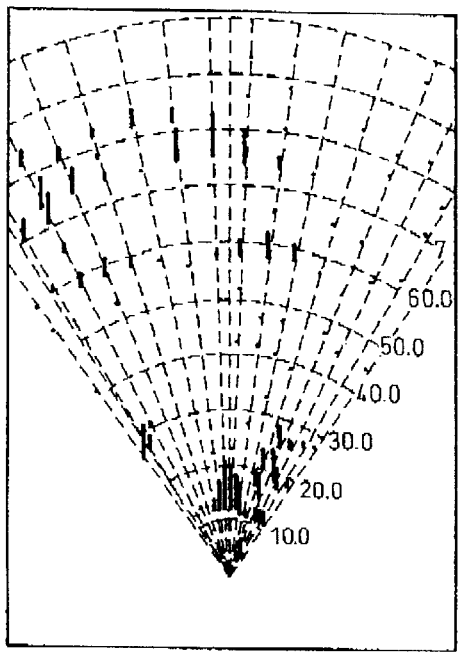
Figure 5B:
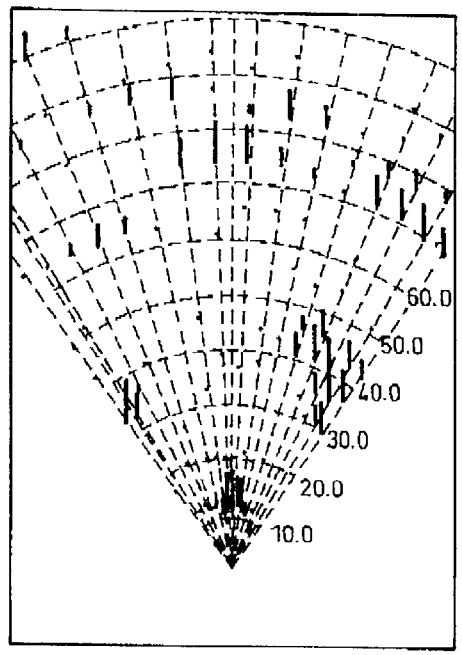

In this process, as shown at step 401 in FIG. 4, the extraction of peak data is first carried out. FIG. 5A shows up-beat signals by reflected waves of beams when sixteen beams are irradiated at a uniform angle within a 16 degree range widened leftward and rightward at 8 degrees about a center line of zero degrees of the front of the host vehicle, and FIG. 5B shows down-beat signals of the respective beams. The direction away from the antenna shows the frequency, and data of FIGS. 5A and 5B are obtained every time when the antenna scans from left to right or from right to left.

At the next step 402, the peak data of the beat signals shown in FIGS. 5A and 5B are collected together and a representative frequency and angle are calculated. These peak data is subjected to the grouping process for detecting the existence of the target.

Figure 6A:
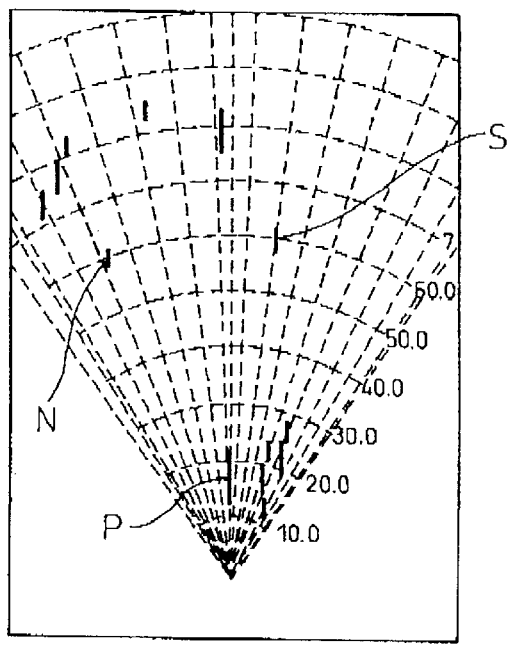
Figure 6B:
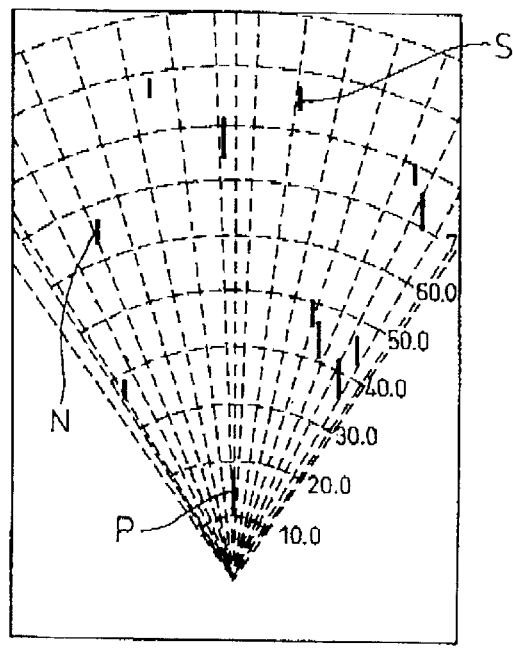

FIGS. 6A and 6B solely show peaks of the up-beat and the down-beat after the grouping process by the microprocessor. As described before, as the sixteen beams are irradiated from the antenna at the front of the host vehicle, the peaks exist on the beams. In FIGS. 6A and 6B, a peak represented by a mark S shows a stationary objective.

Figure 7:
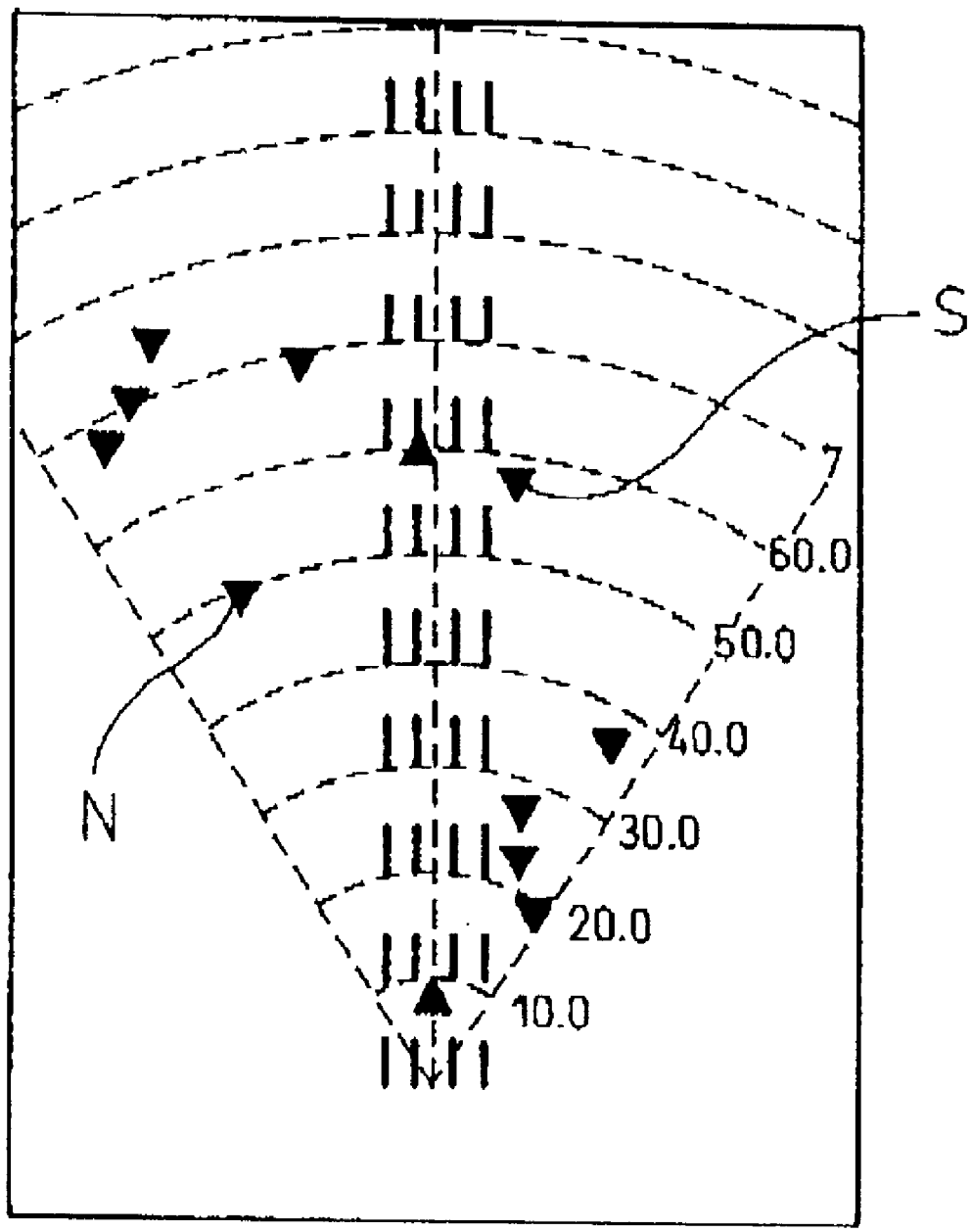
FIG. 7 illustrates a map after the pairing is carried out by the correspondence between the up-beats and the down-beats.

At step 403, the pairing is carried out. After carrying out the pairing in such a manner, a process for the judgement of target continuity is carried out at step 404. The process for the judgment of target continuity is to determine whether or not there is the continuity between the result of the pairing and the internal data obtained at the preceding time. The judgement of the continuity is carried out, for example, by using the difference in distance, speed or lateral position of the target, Next, at step 405, the pairing of data grouped as stationary objective is carried out. In FIG. 7, a mark N is a result obtained from the pairing of the stationary objective.

Here, a method for controlling the lateral fluctuation of the target in the method for recognizing the target running at front of the host vehicle 5 in the microcomputer 5 as described above will be explained in more detail.

Figure 8A:
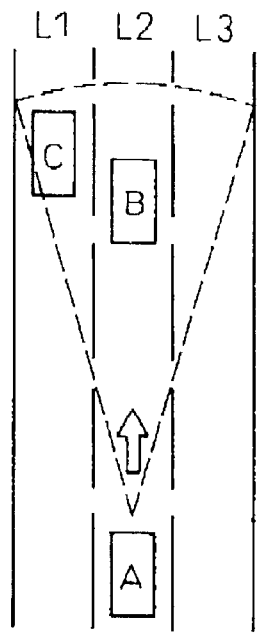

FIG. 8A illustrates a state wherein, in a three-lane road, the host vehicle A carrying the radar device according to the present invention is running on a central lane L2 in an arrowed direction, a vehicle B is running on the same lane in the same direction as the host vehicle A, and a vehicle c is running on a left lane L1 in the same direction. A sector area shown by a broken line is a irradiation range of the radar beam of the vehicle A.

When the target is detected by irradiating the beam in front of the vehicle A, the radar device is provided with an angle judgement reference value for judging that the target is identical if the difference in beat angle between the preceding time and this time is less than this value and the target is different if the. difference is more than this value. Instead of this angle judgement reference value, a distance judgement reference value may be used for judging the identity of the target by the moving distance of the preceding vehicle between the irradiation of the preceding time and that of this time.

Figure 8B:
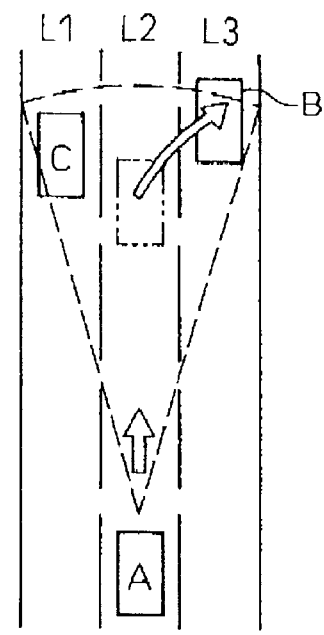
Figure 8C:
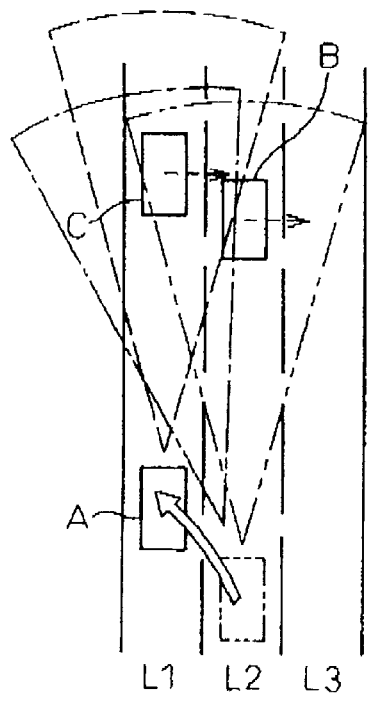

FIG. 8B shows a state wherein the preceding vehicle B running on the same lane L2 as that of the vehicle A shown in FIG. 8A changes the lane from L2 to L3. As such a lane change of the preceding vehicle B is within the judgement reference value, there is no problem in the continuity of the preceding vehicle B.

However, as the irradiation range of the beam is largely shifted when the vehicle A changes the lane from L2 to L1 as shown in FIG. BC, the beat received by the vehicle A shows that the target largely fluctuates in the same direction even if the running state of the preceding vehicles B and C is not changed, whereby the angular difference between the beats obtained at the preceding time and this time of the preceding vehicles B and C exceeds the angle judgement reference value as well as the moving distances in the lateral direction of the preceding vehicles B and C obtained at the preceding time and this time exceeds the distance judgement reference value. AS a result, the continuity of the preceding vehicles B and C is interrupted and these vehicles are judged as new vehicles, whereby data of the preceding vehicles B and C becomes unreliable.

According to the present invention, when both of the preceding vehicles B and C largely fluctuate in the lateral direction, the above-mentioned judgement reference value is changed by assuming that the vehicle A changes its traffic lane, so that the continuity of the preceding vehicles B and C are judged in a wider range. This change in judgement reference value may be carried out by increasing the angle judgement reference value for judging the difference in angle between the beat at the preceding time and that at this time by a predetermined angle or by increasing the distance judgement reference value for judging the moving distance in the lateral direction of the preceding vehicles B and C between the preceding time and this time by a predetermined distance. As a result, the continuity of the preceding vehicles B and C is maintained so that the erroneous judgement that the vehicles are new is avoidable and data of the preceding vehicles B and C is reliable.

Figure 9:
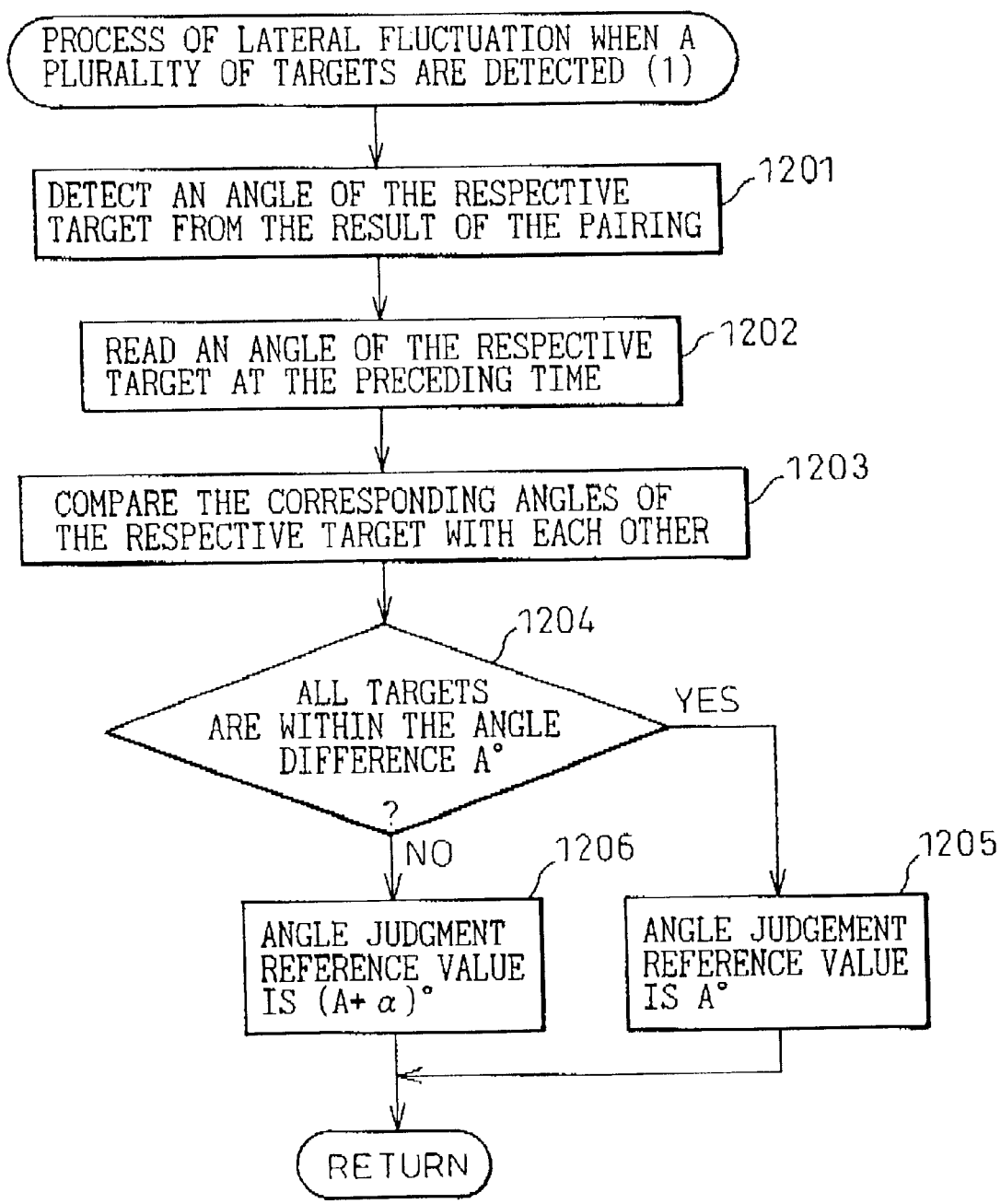
FIG. 9 is a flow chart for processing the lateral fluctuation when a plurality of targets shown in a first embodiment of the present invention are detected.

FIG. 9 is a flow chart showing the above-mentioned procedure of the microprocessor which is a first embodiment of the processing of the lateral fluctuation when a plurality of targets are detected in the present invention. At step 1201, an angle of the respective target is detected based on a result of the pairing. At the subsequent step 1202, an angle of the respective target at the preceding time is read. At step 1203, the corresponding angles of the respective target are compared with each other.

At step 1204, it is determined whether or not the difference in angle of all the targets between the preceding time and this time is within the angle judgement reference value A°. If the difference in angle of all the targets between the preceding time and this time is within the angle judgement reference value A°, the routine proceeds to step 1205, while maintaining the angle judgement reference value A° as it is. on the other hand, if it is judged that the difference exceeds the angle judgement reference value A° at step 1204, the routine proceeds to at step 1206 and the angle judgement reference value is changed to (A+α). In this manner, the angle judgement reference value is set and the continuity of all the targets is judged again.

This angle judgement reference value A may be, for example, ±0.7 degree and α may be 0.5. Instead of the angle judgement reference value, the distance judgement reference value may be used. In this case, the distance judgement reference value may be 1 m and the above-mentioned α may be 0.8 m. In this regard, these values are mere examples and the judgement reference value is not limited thereto. The change of the judgement reference value in the present invention is characterized in that if all the preceding vehicles move in the same direction, it is assumed that the host vehicle has changed its traffic lane, so that the continuity of the preceding vehicles is judged in a wide range.

Contrarily, as a position of the preceding vehicle is not largely changed if the preceding vehicle makes a lane change, the continuity is judged within a narrow range. Accordingly, when the preceding vehicle approaches a guard rail, the continuity is not judged by judging that the preceding vehicle does not move to this position at this time, and the angle of the preceding vehicle is maintained at the original angle. An example of this case will be described later.

Figure 8D:
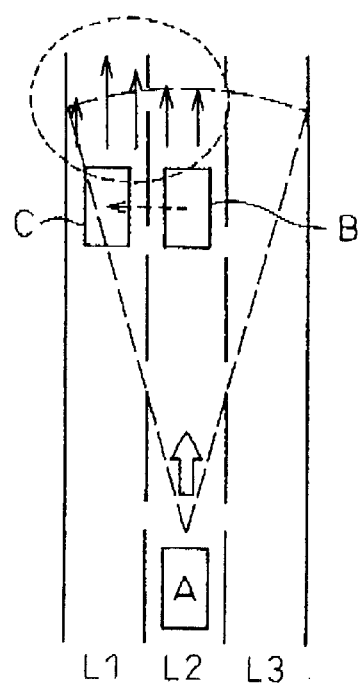

As shown in FIG. 8D, if the preceding vehicle B running on the same lane L2 as the host vehicle A is adjacent to the preceding vehicle C running on the adjacent traffic lane L1 in a side-by-side manner, the reflection from the preceding vehicle B is overlapped with the reflection from the preceding vehicle C as shown in this drawing. Then, the detected beams of the preceding vehicle B which are three at the preceding time becomes five at this time. If these five beams are assumed as one large block of beats, the lateral position of the preceding vehicle B largely fluctuates toward the adjacent vehicle. However, in such a case, this large block of beats is assumed as separate beats of the preceding vehicles B and C so that the lateral continuity of the preceding vehicles B and C is judged between the preceding time and this time. In this case, the judgement reference value may not be changed.

The operation of the microprocessor 5 in this case will be described with reference to a flow chart in FIG. 10 as a second embodiment of the processing of lateral fluctuation when a plurality of targets are detected according to the present invention. In this regard, as steps 1201 to 1204, already explained with reference to the flow chart of FIG. 9, are the same also in this embodiment, the same step numbers are used for denoting the same steps and the explanation thereof is omitted.

In the second embodiment, if the answer is YES at step 1204, the routine proceeds to step 1207 at which the judgement is made that all the targets satisfy the continuity, it is judged that the angular difference of all the targets is not within A°, the routine proceeds to step 1301 at which it is judged whether or not the number of detected beams of the target which angular difference is not within A° is 1.5 times the number of detected beams at the preceding time. If the answer is NO at step 1301, the routine proceeds to step 1307, and the continuity is not taken for the target not satisfying the angular difference within A°. Thus, the judgement is made that the target is new and this routine is finished.

On the other hand, if the judgement is YES at step 1301, the routine proceeds to step 1302 at which the judgement is made that two targets approach and the detected beams are divided into two parts. At step 1303, the re-pairing of the respective beams is carried out and the angle of the target is detected and compared with the angle obtained at the preceding time. At the subsequent step 1304, it is judged whether or not the angular difference is within A° as a result of the comparison at step 1303. If the answer is YES at step 1304, the routine proceeds to step 1305 at which the judgement is made that the target having the angular difference within A° satisfies the continuity, and this routine is finished. On the other hand, if the answer is NO at step 1304, the routine proceeds to step 1306 at which the judgement is made that the target having the angular difference exceeding A° is a new one, and this routine is finished.

Figure 11A:
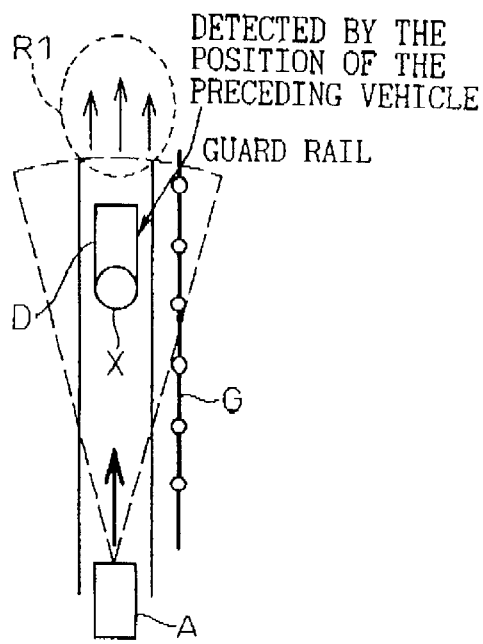

FIG. 11A shows a case wherein the host vehicle A is running on a predetermined traffic lane and another vehicle (a preceding vehicle) D is running on the same lane at the front of the vehicle A while a guard rail G exists on the right side of the vehicle A. In such a case, the microprocessor 5 recognizes a position X of the preceding vehicle D by a plurality of beats R1 reflected from the preceding vehicle D and also recognizes a position of a stationary objective such as a guard rail G.

Figure 11B:
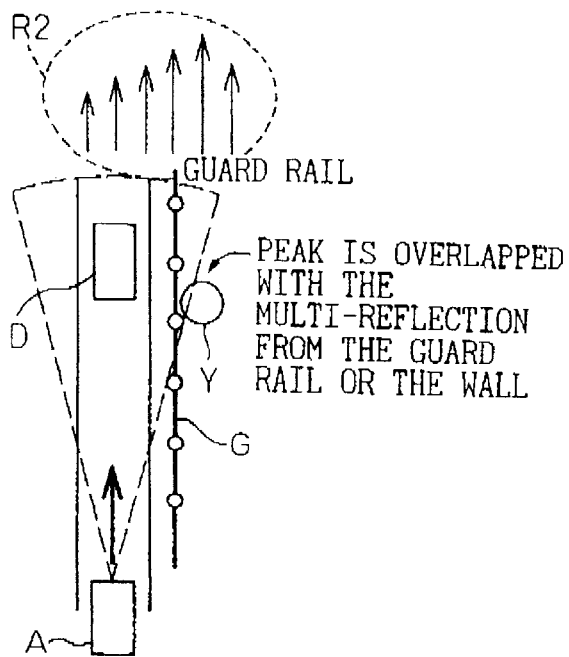
Figure 11C:
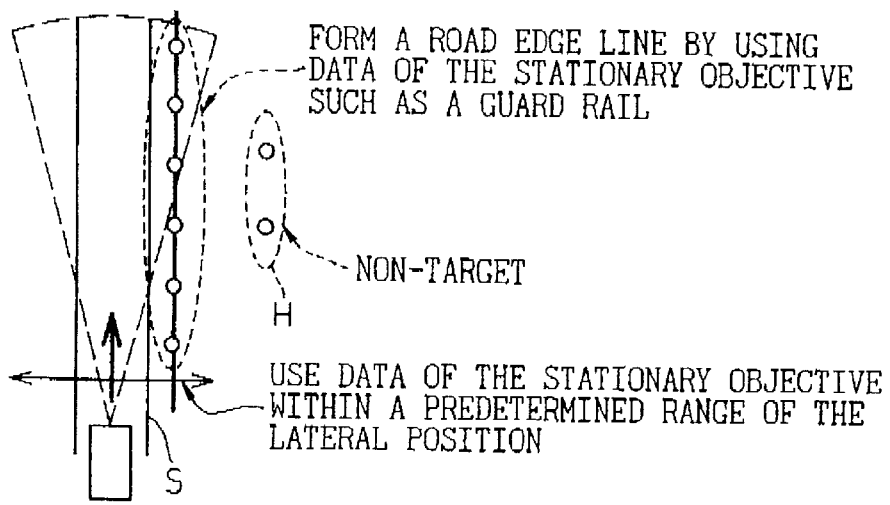

That is, in the radar device according to the present invention, as shown in FIG. 11C, a road edge line S of the traffic lane is always formed from the position of the stationary objective such as a guard rail G. A method for forming the road edge line S is such that data of the stationary objective such as a guard rail G or a tree existing in a defined range of a lateral position from the position of the vehicle A, for example, within 5 meters therefrom, is used for forming the road edge line S. A stationary objective as shown by a mark H in FIG. 11C at a position farther by 5 m or more from the vehicle A is not used for forming the road edge line S.

It is assumed that a state shown in FIG. 11A is obtained as data of the preceding time and data detected at this time becomes as shown in FIG. 11B. The state shown in FIG. 11B is a case wherein the multiple reflection from the guard rail G or the wall is overlapped with peaks and the reflection beat from the preceding vehicle D spreads as shown by a mark R2.

When the data obtained at this time is as shown in FIG. 11B the position of the preceding vehicle D calculated based on the beat obtained at this time is a position indicated by a mark Y in FIG. 11B which means that the preceding vehicle D is located outside the guard rail G. In such a case, according to the present invention, the continuity of the position of the preceding vehicle D is not judged at the mark Y but is judged at a position of the road edge line. Also, the angle of the preceding vehicle D is made to be identical to the angle detected at the preceding time. That is, the position of the preceding vehicle D is judged not to be at a position outside the road edge line S. If the multiple reflection from the guard rail or wall is eliminated by judging the position of the preceding vehicle D in such a manner, a state of a plurality of beats reflected from the preceding vehicle D returns to the original state shown in FIG. 11A, whereby it is possible to reliably track the preceding vehicle D.

If such a condition continues for a long time, an accuracy of the judgement will be lost. However a timing at which the preceding vehicle overlaps with the guard rail or other stationary objective is instantaneous and there are many cases wherein the reflection solely from the preceding vehicle is obtained at the next time, whereby it is possible to maintain the continuity with the inherent position of the preceding vehicle.

Further, according to the present invention, when the reference value (angle or moving distance) for judging the continuity of the target between the irradiation at the preceding time and that at this time is not changed in a case wherein a plurality of preceding vehicles are moved, an amount of the movement of a certain vehicle is larger than this judgement reference value and those of the other vehicles are smaller than the judgement reference value, the amount of the movement of the certain vehicle is guarded by the judgement reference value so that the certain vehicle is treated as if it did not move while exceeding the judgement reference value.

The operation of the microprocessor 5 in this case will be explained as a third embodiment of the present invention for the processing of the lateral fluctuation when a plurality of targets are detected, with reference to a flow chart shown in FIG. 12. At step 1501, an angle of the respective target is read from the result of the pairing. At the subsequent step 1502, an angle of the respective target obtained at the preceding time is read. At step 1503, the road edge line is calculated from data of the stationary objective, and at step 1504, the angles of the corresponding targets are compared with each other.

At step 1505, the judgement is made whether or not the difference in angle of the respective target between the preceding time and this time is within the angle judgement reference value A°. If the difference in angle of the respective target between the preceding time and this time is within the angle judgement reference value A°, the routine proceeds to step 1510 at which the judgement is made that the respective target satisfying this judgement reference value A° satisfies the continuity. On the other hand, if the judgement at step 1505 is that the difference in angle exceeds the judgement reference value A°, the routine proceeds to step 1506 at which the judgement is made whether or not the lateral position of the target exceeding the reference value is outside the road edge line calculated at step 1503.

When the judgement is made at step 1505 that there is no target exceeding the angle difference A° outside the road edge line, the routine proceeds to step 1511 at which the target angle is guarded by the angle judgement reference value A°, and the routine is finished. On the other hands if the judgement is made at step 1505 that there is a target exceeding the angle difference A° outside the road edge line, the routine proceeds to step 1507 at which the judgement is made whether or not this target is continuously outside the road edge line at a predetermined number of times, for example, three times. This is because, as the timing at which the preceding vehicle overlaps with the stationary objective such as a guard rail is instantaneous as described before and there are many cases wherein the reflection is obtained solely from the preceding vehicle at the next time, the continuity with the inherent position of the preceding vehicle can be maintained when this phenomenon continues one or two times.

Accordingly, if the answer at step 1507 is NO, the routine proceeds to step 1508 at which the target position outside the road edge line is guarded by the road edge line, and this routine is finished after the judgement is made that the target satisfies the continuity. On the other hand, if the judgement at step 1507 is YES for any reason, the routine proceeds to step 1509 at which the judgement is made that there is no continuity in the target and the target is a new one, and thereafter this routine is finished.

While the host vehicle and the preceding vehicle are running on a straight road in the above-mentioned embodiment, the extraction of the preceding vehicle will be described below in a case wherein the host vehicle and the preceding vehicle are running on a curved road (curve).

In general, a sensor is mounted on the vehicle itself, for detecting that the vehicle is running on the curve. This sensor is a steering sensor 14 for detecting a steering angle of the steering wheel or a yaw rate sensor 15 described with reference to FIG. 1. An inter-vehicle distance control ECU 20 calculates curvature information of the road on which the vehicle is running by the steering sensor 14 or the yaw rate sensor 15. The inter-vehicle distance control ECU 20 also obtains a vehicle speed from the detected value of the vehicle speed sensor 16. The inter-vehicle distance control ECU 20 transmits the obtained curvature information and the vehicle speed to the microprocessor 5.

As described in the above-mentioned embodiment, the microprocessor 5 can calculate a distance of the guard rail from a side of the vehicle when the vehicle is running a curve by detecting a peak of the beat in the reflected beam. Accordingly, the microprocessor 5 corrects the guard rail in accordance with the curvature information and the vehicle speed by the positional information of the guard rail and the curvature information and the vehicle running information (hereinafter referred to as curve R) input from the inter-vehicle distance control ECU 20. If the guard rail can be corrected in such a manner in accordance with the curve R, it is also possible to correct the road edge line in accordance with the curve R. Therefore, in the radar device of the present invention, the continuity of the preceding vehicle is also corrected by this curve R so that the preceding vehicle is guarded not moving outside the guard rail or the road edge line.

For example, when there are some preceding vehicles running at the front of the host vehicle and a stationary objective such as a guard rail on the lateral side of the host vehicle, as the curve R of the road is known by the lateral position data of the stationary objective and the vehicle speed, it is possible to estimate the relative position of the stationary objective or the preceding vehicle by the curve R and data of the lateral position of the stationary objective. For example, if it is known that there is a guard rail at a position rightward by 4.5 m from a center of the vehicle, it is possible to estimate the position of the guard rail by using the Curve R at the same time. From this position of the guard rail, the position of the preceding vehicle is estimated.

Figure 13:
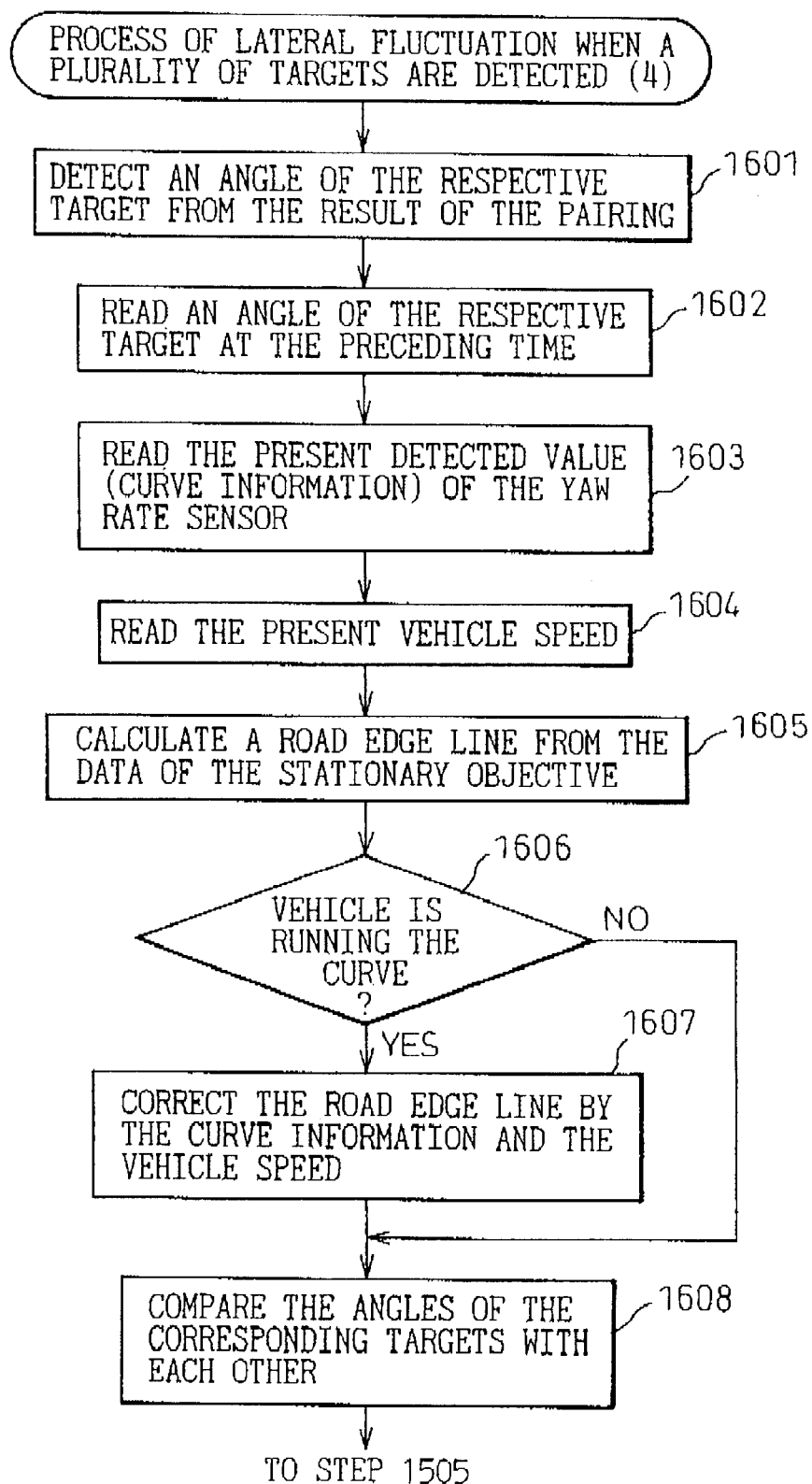
FIG. 13 is a flow chart for processing the lateral fluctuation when a plurality of targets shown in a fourth embodiment of the present invention are detected.

The operation of the microprocessor 5 in this case will be explained as a fourth embodiment of the present invention for the processing of the lateral fluctuation when a plurality of targets are detected, with reference to a flow chart shown in FIG. 13. Note that since the guard itself by the road edge line when the vehicle is running on the curve is the same as the guard by the road edge line when the vehicle is running on the straight road, the explanation of step 1505 and steps thereafter in the procedure explained with reference to FIG. 12 will be eliminated here.

In the fourth embodiment, an angle of the respective target is detected from the result of pairing at step 1601, and the angle of the respective target at the preceding time is read at step 1602. At step 1603, the information of the curve on which the vehicle is running is read from the present value detected from the yaw rate sensor, and at the subsequent step 1604, the present vehicle speed is read from the vehicle speed sensor. Thereafter, at step 1605, the road edge line is calculated from data of the stationary objective, and at step 1606, the judgement is made whether or not the vehicle is running on the curve from the detected value of the yaw rate sensor read at step 1603. If it is judged that the vehicle is not running on the curve, step 1607 in eliminated but the routine proceeds to step 1608 at which corresponding angles of the respective target are compared. On the other hand, it the judgement is made at step 1606 that the vehicle is running on the curve, the routine proceeds to step 1607 at which the road edge line is corrected in accordance with the curve information read at step 1603 and the vehicle speed read at step 1604, and thereafter the routine proceeds to step 1608 at which corresponding angles of the respective target are compared with each other. The operation at step 1505 for judging whether or not the difference in angle of the respective target between the preceding time and this time is within A° which is the judgement reference value and steps thereafter are the same as those in FIG. 12.

Further, the microprocessor 5 according to the present invention is capable of processing a case wherein the preceding vehicle is overlapped with a stationary objective spreading widely in the lateral direction such as a road guide sign located at the front of the vehicle or an overbridge crossing the road. For example, it is assumed that the overbridge is located at the front of the host vehicle and the preceding vehicle approaches this overbridge. While the preceding vehicle is detectable for four or five beats, beats due to widthwise beams are detected in a case of the overbridge. As the overbridge becomes closer, there is a portion overlapped with the preceding vehicle in a range in the longitudinal direction of the beam. In such a case, the beats from the preceding vehicle are hidden by the beats from the overbridge, and the detection is made as if the preceding vehicle largely moves in the lateral direction, resulting in the interruption in the continuity of the preceding vehicle.

According to the present invention, when such an overbridge wide spread in the lateral direction is detected beforehand, care is taken that the beat of the preceding vehicle is not influenced by the beat of the overbridge. For example, even if the moving angle of the preceding vehicle in the lateral direction is (A+α)°, for example, 1.2° in a state wherein the overbridge has been detected, the moving angle of the preceding vehicle is limited, for example, to the maximum value A° of a usual angle judgement reference value, for example, 0.7°. As a result, the continuity of the preceding vehicle is not interrupted and the tracking of the preceding vehicle is assuredly carried out.

Note that in the above embodiment, although the millimetric wave radar device is used for the explanation, the kind of the radar should not be limited.

Figure 14:
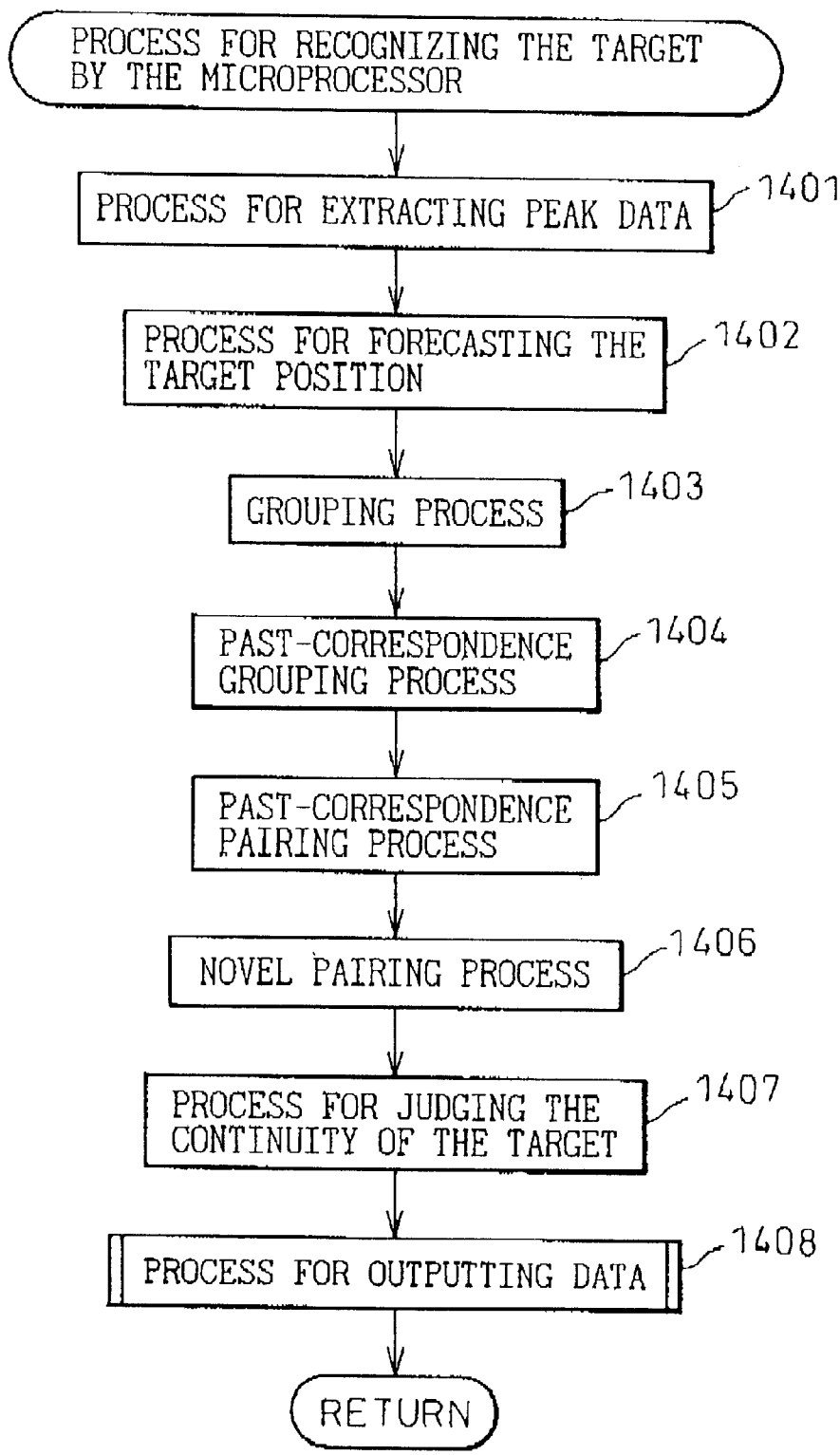
FIG. 14 is a flow chart illustrating another example of a process for recognizing a target in a microprocessor according to the present invention.

An outline of other examples of the process for recognizing the target running at the front of the host vehicle by the microprocessor 5 mounted on the radar device according to the present invention will be explained below based on a flow chart shown in FIG. 14 and actually obtained data shown in FIGS. 15 to 20. The process shown in FIG. 14 is carried out every time when the antenna 1 scans the front of the vehicle. Hereinafter, the vehicle carrying the on-vehicle radar device and executing the recognition of the target is referred to as host vehicle A.

In this process, the extraction of peak data is first carried out. FIG. 5A shows a map of up-beat signals by the reflected waves of the respective beams, and FIG. 5B shows a map of down-beat signals of the respective beams. In these maps, the direction away from the antenna represents the frequency, and data of FIGS. 5A and 5B are obtained every time when the antenna swings from left to right or right to left.

At the subsequent step 1402, a forecasting process of a distance (a position) from the host vehicle A to the target is carried out. That is, for the purpose of judging the continuity of the target, a distance (position) of the target from the vehicle A at this time is calculated. In this calculation, the distance at this time is calculated from the distance calculated at the preceding time while assuming that a relative speed of the target is constant. Also, the forecasted frequency of the target at this time is calculated.

At step 1403, peak data are collected from a map of the beat signals shown in FIGS. 5A and 5B, and the representative frequency and angle are calculated. These peak data are grouped to carry out the process for detecting the existence of the target.

Maps shown in FIGS. 6A and 6B solely show peaks of the up-beat and the down-beat after being grouped by the microprocessor 5. As described before, as sixteen beams are irradiated forward of the vehicle A from the antenna, the peaks are on these beams. In FIGS. 6A and 6B, a peak shown by a mark S represents the stationary objective; a peak shown by a mark P represents the peak having the continuity from the past and required to be preferentially paired (only one peak is marked herein); and a peak shown by a mark N represents a novel peak described later.

At step 1404, a past-correspondence grouping process, which is a process for collecting the peaks in the vicinity of the forecast position, is carried out. At step 1405, the past-correspondence pairing is carried out by taking the continuity of the past peak value into account, and at step 1406, a novel pairing is carried out. That is, from the frequencies forecast at step 1402, the pairing is carried out by the correspondence between the peaks of the up-beat and the down-beat shown in FIGS. 6A and 6B. A map obtained by this pairing is shown in FIG. 7. In FIG. 7, all marks having no sign are obtained by the preferential pairing.

At step 1406, a novel pairing process is carried out on a peak N in FIGS. 6A and 6B which could not be subjected to the preferential pairing in the past-correspondence pairing process. After being paired in this manner, the continuity judgement process is carried out at step 407. The continuity judgement process is a process for judging whether or not the continuity exists in a result of the novel pairing with internal data obtained at the preceding time.

Thereafter, a necessary process such as the processing of the stationary objective is carried out at step 1408, and this routine is finished after a data output process for selecting an output data is carried out.

The procedure in the microprocessor mounted on the radar device of the present invention, for the past-correspondence grouping (step 1404) and the past-correspondence pairing (step 1405) in the recognition processing of the target running at the front of the host vehicle A will be described in more detail.

Figure 15:
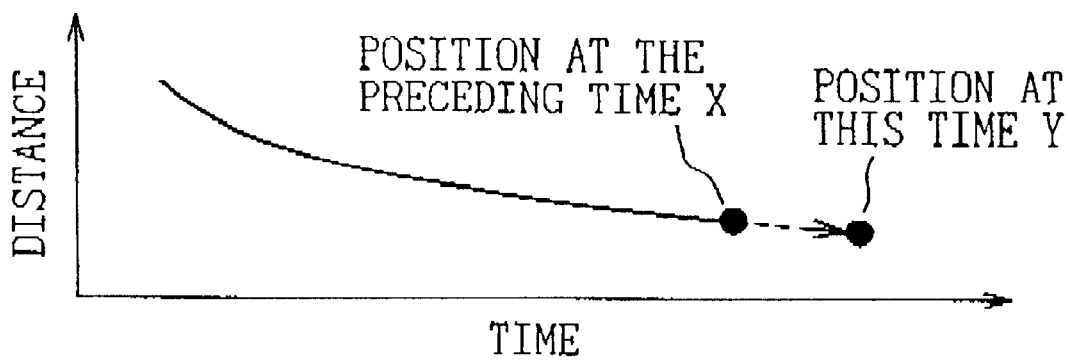
FIG. 15 illustrates a forecasting process in the grouping process.
Figure 16:
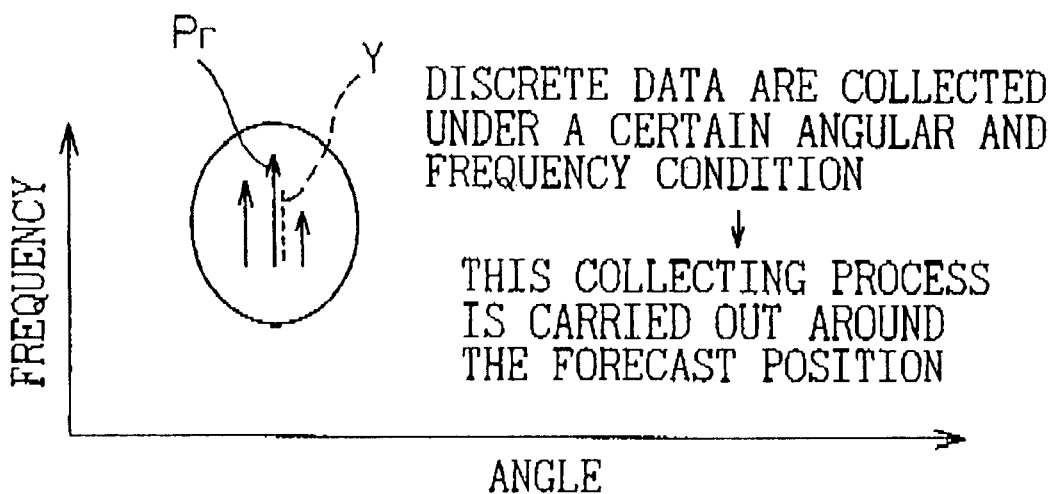
FIG. 16 illustrates a map of angles relative to frequencies in either of the up-beat or down-beat.

FIGS. 15 and 16 explain a basic concept of the procedure of the grouping in the present invention. A solid line in FIG. 15 represents a transition of one target obtained by the pairing, that is, a State in which a distance of one target, of which the existence is recognized from the host vehicle A, changes with time, and a position shown by a point x represents a position of the target at the preceding time. In this case, the microprocessor 5 explained in FIG. 1 forecasts a position Y of the target at this time from the past transition of the target both in the up-beat and the down-beat. The position forecast by the microprocessor 5 contains a frequency component and an angle component of a peak at this position.

FIG. 16 is a map of the frequency to the angle in either of the up-beat or the down-beat. While there are generally a plurality discrete peak data on this map, a peak data of only the one target explained in FIG. 15 is shown here. In the usual grouping, as described in FIG. 3, the grouping is carried out so that discrete peak data are collected under certain angle and frequency condition. On the other hand, according to the present invention, the position Y of the target at this time are forecast from the past transition of the target, and the collecting process of the grouping at this time, carried out in the up-beat and the down-beat, is executed in a predetermined retrieval range around the forecast position Y of the target at this time. Such a grouping around the forecast position Y of the target at this time is referred to as a past-correspondence grouping hereinafter.

A distance data in the past-correspondence grouping is calculated from a distance of the target at the preceding time and a relative speed of the target at the preceding time, and an angle data is obtainable by the calculation under the assumption that an absolute lateral position is the same from a target angle, the calculation under the assumption that a relative lateral position is the same or the calculation assumed from the movement of the past lateral position of the target.

For example, in FIG. 16, if a position shown by a broken line is a forecast position, the past-correspondence grouping is carried out around this forecast position Y to calculate a representative peak Pr. When the representative peak Pr is calculated, a frequency is calculated back from the forecast position Y at this time, and a peak is retrieved around the resultant frequency and angle. Among such peaks, one capable of taking the correspondence is the representative peak Pr at this time. If there are a plurality of calculated forecast positions Y, the past-correspondence grouping is carried out a plurality of times.

After all the past-correspondence groupings around the forecast position Y at this time have been finished, the grouping processing is carried out as usual in the up-beat and the down-beat of the remaining peak data. Thereafter, the microprocessor 5 carries out a pairing using the representative peak of the up-beat and the down-beat calculated by the past-correspondence grouping and a pairing of the representative peak obtained by the usual grouping.

Cases wherein a vehicle (target) running at the front of a host vehicle A has various positional relationship to the host vehicle A and concrete examples of the past-correspondence grouping in accordance with receiving conditions of the reflected wave from the target will be explained.

Figure 17:
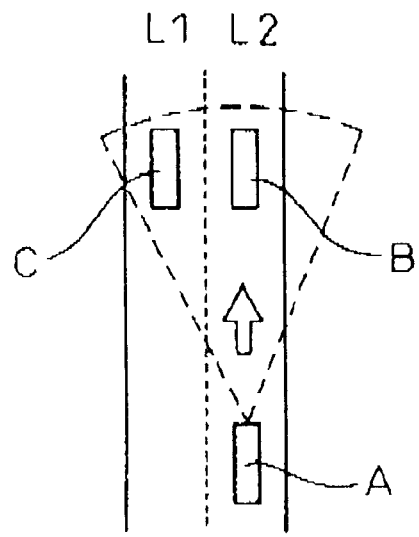
FIG. 17 is a positional-relationship diagram for explaining the running state of the host vehicle and a plurality of targets in a fifth embodiment according to the present invention.

A fifth embodiment is that, as shown in FIG. 17, a host vehicle A carrying the radar device according to the present invention is running on a passing road L2 in the arrowed direction; a vehicle B is running in the same direction on the same traffic lane as the vehicle A at the front thereof; and a vehicle C is running in the same direction on a left traffic lane L1 on the side of the vehicle B. A sector area shown by a broken line is an irradiation range of the radar beam from the host vehicle A.

Figure 18:
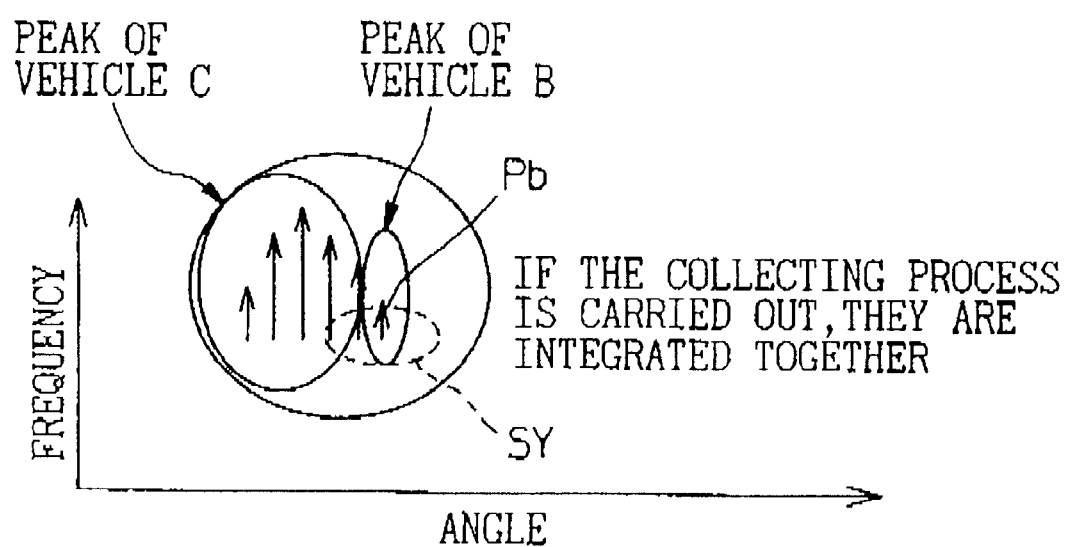
FIG. 18 a diagram for illustrating the peak characteristic of the up-beat and the down-beat in the state shown in FIG. 17.

In this case, since peaks of the vehicles B and C are close to each other, they are collected as one large group as shown in FIG. 18 by a usual collecting process in the grouping. And, for example, in a case wherein the vehicle C is larger in size and the reflection factor and the power of peak are larger than those of the vehicle B, the peak of the vehicle B is embedded in the peak of the vehicle C.

On the other hand, according to the collecting process in the past-correspondence grouping of the present invention, a forecast position Y of the vehicle B at this time is obtained by the past behavior of the vehicle B as described before, and a predetermined retrieval range SY around the forecast position Y at this position is determined as shown in FIG. 8 by a broken line. And, a peak corresponding to the forecast position Y within this retrieval range is referred to as a representative peak Pb of the vehicle B. Accordingly, even if the peak of the vehicle B embedded in the peak of the vehicle C, the peak of the vehicle B is detectable, FIG. 19 illustrates a case wherein the peak of the vehicle B is embedded in the peak of the vehicle C in the up-beat but not embedded in the peak of the vehicle C in the down-beat. In this case, as the peak of the vehicle B is not embedded in the peak of the vehicle C in the down-beat, it is possible to accurately have the correspondence with one peak which is the representative peak Pbd by the past-correspondence grouping. On the other hand, in the up-beat, the peak of the vehicle B is embedded in the peak of the vehicle C. In the retrieval range SY of the forecast position Y, a peak Pbu is detected in the vicinity of the forecast position Y and a peak Pn having a power larger than the peak Pbu is detected at another position. In such a case, according to the present invention, it is judged that peaks of the up-beat are embedded in which the peak Pbd is the representative.

When the pairing of the representative peak Pbu of the up-beat and the representative peak Pbd of the down-beat is carried out, an angle of the down-beat is adopted, in which the representative peak Pbd is detected in the vicinity of the forecast position Y within the retrieval range.

Figure 20A:
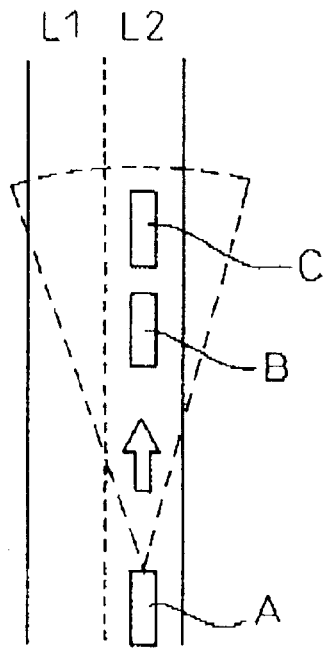
Figure 20B:
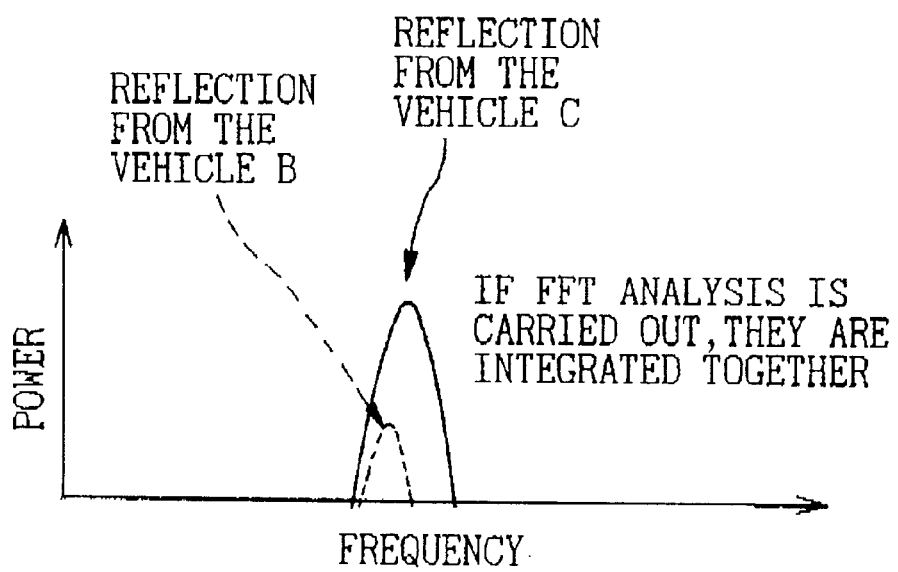

A sixth embodiment is an example wherein, in FIG. 20A, the vehicle A carrying the on-vehicle radar device according to the present invention is running on a passing lane L2 of a two-traffic lane road in the arrowed direction; the vehicle B is running on the same lane in the same direction at the front of the vehicle A; and the vehicle C is running on the same lane L2 in the same direction at the front of the vehicle B. Also in this case, a sector area shown by a broken line is an irradiation range of the radar beam of the vehicle A by the scanning.

In this case, if the beat signal is FFT-analysed in DSP 4 described with reference to FIG. 1, the reflection of the vehicle B is integral with the reflection of the vehicle C running at the front of the vehicle B. For example, in a case wherein the vehicle C is a large-sized vehicle having a large reflection factor and the power of the peak of the vehicle C is larger than the power of the peak of the vehicle B, the peak of the vehicle B is embedded in the peak of the vehicle C.

Figure 21:
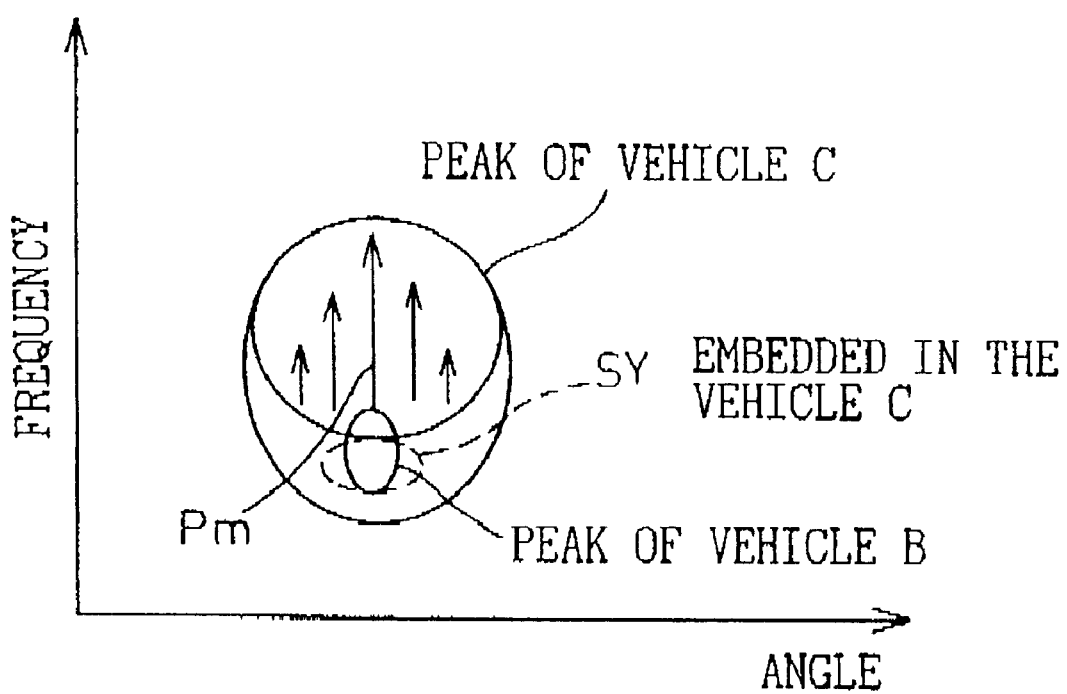
FIG. 21 is a diagram illustrating the peak characteristic of the up-beat or the down-beat in the state of FIG. 20A.

On the other hand, in the collecting process in the past-correspondence grouping according to the present invention, the forecast position Y of the vehicle B at this time is obtained by the past behavior of the vehicle B as described before, and a predetermined retrieval range SY is determined around the forecast position Y at this time as shown in FIG. 21 by a broken line. If no peak is detected in the retrieval range SY, the peak is retrieved in the frequency direction. If a peak having a large power exists in the frequency direction (Pm), the judgement is made that the peak of the vehicle B is embedded.

FIG. 22 illustrates a state wherein the peak of the vehicle B is embedded in the peak of the vehicle C in the up-beat but the peak of the vehicle B is not embedded in the peak of the vehicle C in the down-beat in the state shown in FIG. 21. In a state wherein the peak of the vehicle B is embedded in the peak of the vehicle C in the up-beat but the peak of the vehicle B is not embedded in the peak of the vehicle C in the down-beat, the accurate correspondence is taken with one peak in the down beat by the past-correspondence grouping, and this peak is determined as a representative peak Pbd.

It is assumed that while the peak is not detected in the vicinity of the forecast position Y in the retrieval range SY of the forecast position Y, a peak Pm having a large power is detected at another position having the different frequency.

in this case, according to the present invention, the representative peak Pbd detected in the down-beat is compared with the peak Pn detected at a position shifted in the frequency direction from the forecast position Y. If the power of the peak Pm is larger than the power of the representative peak Pbd, it is judged that the peak is embedded in the up-beat.

When the pairing is carried out between the forecast frequency of the up-beat and the representative peak of the down-beat, the angle of the down-beat in which the representative peak Pbd is detected in the vicinity of the forecast position Y within the retrieval range is adopted as a target angle.

Figure 23A:
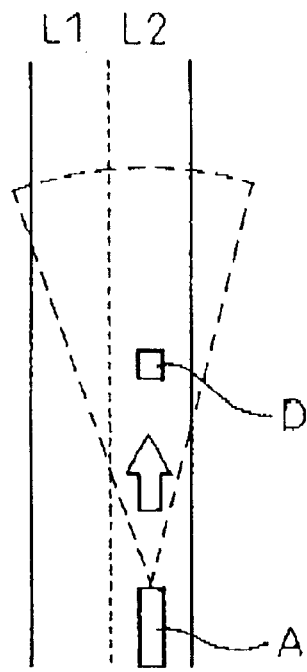
Figure 23B:
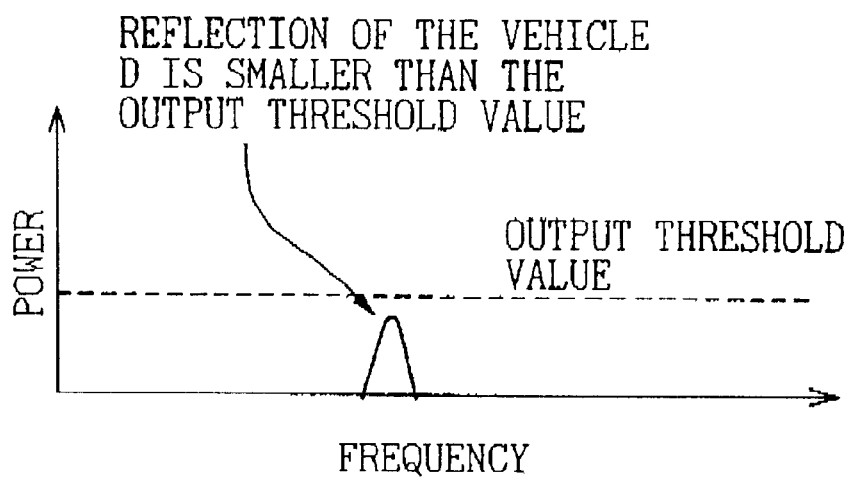

A seventh embodiment is an example wherein, in FIG. 23A, the vehicle A carrying the on-vehicle radar device according to the present invention is running on a passing lane L2 of a two-traffic lane road in the arrowed direction, and a small vehicle D such as a motor cycle is running on the same lane in the same direction at the front of the vehicle A. Also in this case, a sector area shown by a broken line is an irradiation range of the radar beam of the vehicle A by the scanning In this case, if the beat signal is FFT-analysed in DSP 4 described with reference to FIG. 1, the reflection by the vehicle D is smaller than an output threshold value of DSP 4 because the reflection factor of the vehicle D is small, whereby the vehicle D may be detected. In this case, the peak of the vehicle D is not detected.

In this case, even if the forecast position Y of the vehicle D at this time and the predetermined retrieval range SY around the position Y are determined by the past behavior of the vehicle D as described before when the collecting process carried out in the past-correspondence grouping, since there is no peak corresponding to the forecast position Y in the retrieval range SY, it is impossible to detect the representative peak of the vehicle D. On the other hand, even it the representative peak of the vehicle D is not detectable in the up-beat, the peak of the vehicle D may be detected in the down-beat. A method for the pairing according to the present invention in such a case will be described with reference to FIG. 24.

FIG. 24 shows a case wherein, while the peak of the vehicle D is not detectable because it is smaller than the threshold value in the up-beat, the peak of the vehicle D is detectable in the down-beat because it is larger than the threshold value even though the power thereof is small. In this case, it is possible to accurately take the correspondence with one peak by the past-correspondence grouping, which is the representative peak Pbd.

In this case, according to a seventh embodiment, when a peak having a smaller power corresponding to a representative peak at this time is detected in the vicinity of the forecast position in one of the up-beat and the down-beat by the past-correspondence grouping, but no peak is detected in the vicinity of the forecast position in the other of the up-beat and the down-beat, an presumed grouping process for calculating an presumed representative peak at the same position in the other of the up-beat and the down-beat as that of a representative peak in one of the up-beat and the down-beat is carried out. Then the judgement is made that a target having a small reflected signal is presumed to exists at the front of the vehicle A, and pairing is carried out by solely using the representative peak Pbd detected in the down-beat. An angle of the target when the pairing is carried out is an angle of the representative peak Pbd of the vehicle D detectable within a retrieval range SY of the forecast position Y in the down beat, or an angle detectable at the preceding time in the up-beat or the down-beat is adopted.

Similar to the fifth embodiment, an eighth embodiment is an embodiment wherein a host vehicle A carrying the radar device according to the present invention is running on a passing traffic lane L2 in the arrowed direction, a vehicle B is running on the same lane in the same direction as the vehicle A at the front thereof, and a vehicle C is running on a left traffic lane L1 in the same direction in parallel to the vehicle B as shown in FIG. 17. In this case, as explained with reference to FIG. 18, the forecast position Y at this time of the vehicle B is obtained from the past behavior of the vehicle B in the past-correspondence grouping according to the present invention, and a predetermined retrieval range SY is determined as shown by a broken line around the forecast position Y at this time. A peak in correspondence to the forecast position Y in this retrieval range SY was referred to as the representative peak Pb of the vehicle B.

In the embodiment described with reference to FIG. 19, a case was explained wherein in the state of FIG. 17, the peak of the vehicle B is embedded in the peak of the vehicle C in the up-beat but is not embedded in the peak of the vehicle C in the down-beat, on the other hand, the fourth embodiment is a case wherein the peak of the vehicle B is embedded in the peak of the vehicle C both in the up-beat and the down-beat, and will be explained with reference to FIG. 25.

In this regard, in the eighth embodiment, a case will be explained wherein, while the peak of the vehicle B is embedded in the peak of the vehicle C in the up-beat, the peak Pbu is detected in the vicinity of the forecast position within the retrieval range SY of the forecast position Y by the past-correspondence grouping; and while the peak of the vehicle B is embedded in the peak of the vehicle C in the down-beat, the peak Pbd completely coinciding with the forecast position within the retrieval range SY of the forecast position Y is detected by the past-correspondence grouping. In this regard, the complete coincidence of the peak with the forecast position Y means that both of the frequency and angle of the forecast peak completely coincide with those of the forecast position.

In the past-correspondence grouping according to the present invention, the forecast position Y is provided with a certain retrieval range SY which is, for example, ±1 kHz in the frequency and ±1.2° in the angle, and complete coincidence is a rare case. Thus, in the fourth embodiment, if there is a peak just at the same position as the forecast frequency and the forecast angle, it is assumed that the matching is judged to establish the pairing. Further in the eighth embodiment, a restriction of the peak within the retrieval range SY is eliminated and if a peak is detected at a point having the same frequency, it is assumed that the matching is judged at the peak.

FIG. 25 illustrates the embodiment wherein the complete coincidence is obtained in the forecast position of the peak in the down-beat. In the eighth embodiment, it is judged that if the complete coincidence of the position of the peak is obtained in either one of the down-beat and the up-beat, the judgement is made that the other peak may be embedded.

The eighth embodiment will be described in more detail below. When the complete coincidence of the beat is obtained in both of the frequency and the angle in either one of the frequency and the angle in the up-beat or the down-beat, the pairing is carried out by judging that a peak is embedded even in a state wherein the peak exists within the corresponding retrieval range SY of the other beat but a larger peak also exists at a position shifted in the angular direction.

When the pairing of the representative peak Pbu of the up-beat and the representative peak Pbd of the down-beat is carried out, an angle of the down beat is adopted, from which the representative peak Pbd completely coinciding with the forecast position Y within the retrieval range is detected.

An embodiment will be explained with reference to FIG. 26 as a ninth embodiment, wherein the pairing is not worried out although the peak is detectable within the retrieval range SY in the vicinity of the forecast position Y in the up-beat and the peak is detectable within the retrieval range SY in the vicinity of the forecast position Y also in the down-beat.

As shown in FIG. 26, when the peak Pbu is detected in the up-beat on the right side (a larger angle side) relative to the forecast position Y within the retrieval range SY and the peak Pbd is detected in the down-beat on the left side (a smaller angle side) relative to the forecast position Y within the retrieval range SY, the pairing of the peak Pbu and the peak Pbd is carried out provided the difference in angle between the peaks Pbu and Pbd is within a predetermined range. However, if the difference in angle between the peaks Pbu and Pbd exceeds a predetermined angle, the pairing thereof is not carried out even though both of the peaks Pbu and Pbd are within the retrieval range SY. That is, while the peak is detectable in the fifth embodiment within the retrieval range SY in the vicinity of the forecast position Y either in the up-beat or in the down-beat, the judgement is made whether or not the pairing is to be carried out by observing the angular condition of the both.

A tenth embodiment is an embodiment wherein the pairing is not carried out in such a case that the representative peak at this time is calculated in the vicinity of the forecast position Y in either one of the up-beat and the down-beat by the past-correspondence grouping and a peak is detected in the other beat at a position shifted from the forecast position Y in the angular and frequency directions but not calculated in the vicinity of the forecast position Y. This embodiment will be explained by using FIG. 27.

As shown in FIG. 27, it is assumed that a peak Pbu is detected at a center of the retrieval range SY relative to the forecast position Y in the up-beat and a peak Pbd is detected at a position within the retrieval range SY shifted on the left side (a smaller angle side) from the forecast position Y in the down beat. In this case, the pairing of the peaks Pbu and Pbd is not carried out if there is no beat at a position of the down-beat corresponding to the peak Pbu of the up-beat even if the difference in angle between the peaks Pbu and Pbd is within a predetermined angle.

That is, the tenth embodiment is an embodiment wherein no pairing is carried out even though both the peaks are detectable within the retrieval range SY in the vicinity of the forecast position Y in both of the up-beat and the down-beat and the angular difference therebetween is small. More specifically, the pairing is not carried out when the peak is detected in the vicinity of the forecast position Y within the retrieval range SY in one of the beats but none of peaks including a small one is detected in the vicinity of the forecast position Y within the retrieval range SY in the other beat.

Though not illustrated, an eleventh embodiment is an embodiment wherein the calculation is interrupted, for detecting the representative peak at this time in the vicinity of the forecast position Y in the past-correspondence grouping. In the eleventh embodiment, even if the calculation of the representative peak at this time is interrupted, the tracking of this representative peak is not finished but the calculation of the representative peak at this time is repeated a predetermined times in the vicinity of the forecast position Y. In this case, the retrieval range for the past-correspondence grouping may be widened in the angular or frequency direction in accordance with a length of time for which the calculation of the representative peak is interrupted so that the representative peak at this time is calculated.

In this regard, while a FM-CW radar using a millimetric wave was used as an on-vehicle radar device in the above embodiments, the kind of the on-vehicle radar device should not be limited provided it is a scan type radar.

Since the gist of the present invention resides in that a process for collecting discrete peak data is carried out based on the past information and a matching means is changed when the matching of the up-beat and the down-beat is carried out in accordance with the collecting manner, the present invention is applicable to all radar devices carrying out the above-mentioned collecting process or matching process.

What is claimed is:

1. A radar device for detecting a target by receiving a signal reflected from the target, comprising:
    means for detecting peak data from the reception signal,
    means for grouping the peak data based on the representative frequency and angle of the detected peak data,
    means for pairing the grouped peak data,
    means for judging the continuity between past-detected target data and that detected at this time by the reference value of the lateral fluctuation of the target, and
    means for varying the reference value in accordance with the movement of the detected target.

2. A radar device as defined by claim 1, wherein the reference value changing means comprises means for detecting the lateral fluctuation of the target between the past-detected target data and that detected at this time and
    means for changing the reference value if it is judged that the target moves to exceed the reference value.

3. A radar device as defined by claim 2, wherein the reference value changing means forms the judgement that the target moves while exceeding the reference value when all the lateral movements show generally identical values exceeding the reference value.

4. A radar device as defined by claim 1, further comprising:
    means for detecting the lateral fluctuation of the target between the past-detected target data and that detected at this time and
    means for restricting the lateral fluctuation of a specific target by a predetermined restriction value when the fluctuation exceeding the reference value occurs in data of the specific target while the fluctuation of other target data is within the reference value.

5. A radar device as defined by claim 1 capable of detecting a stationary objective, further comprising:
    means for detecting the lateral fluctuation of the target between the past-detected target data and that detected at this time,
    means for setting a road edge line of a road at the front of a vehicle from the detected stationary objective, and
    means for correcting the lateral fluctuation of the specific target by the road edge line when the fluctuation exceeding the road side line occurs in data of the specific target.

6. A radar device as defined by claim 5, wherein the road edge setting means sets the road side line by using the target judged as the stationary objective within a certain reference distance from the host vehicle.

7. A radar device as defined by claim 5, wherein the road side setting means sets the road side line by using a curve information of the road calculated by means for calculating a curve information of the curved road at the front of the host vehicle.

8. A radar device as defined by claim 1 capable of detecting a stationary objective, further comprising:
    means for detecting the lateral fluctuation of the target between the past-detected target data and that detected at this time,
    means for judging that the target is a specific stationary objective when the target data widely spreads in the lateral direction, and
    means for limiting the lateral fluctuation of a predetermined target data by a predetermined limit value when the predetermined target data is overlapped with the predetermined stationary objective data.

9. A radar device as defined by claim 1 for transmitting a plurality of beams, receiving a predetermined number of beams reflected from the target and detecting the target from peaks of a predetermined number of beat signals obtained by mixing the transmission signal with the reception signal, further comprising:
    means for detecting the lateral fluctuation of the target between the past-detected target data and that detected at this time and
    means for limiting the lateral fluctuation of the past target data at this time by a predetermined limit value.

10. A radar device as defined by claim 1, characterized that the radar device is a radar device using a millimetric wave, and carried by a vehicle.

11. A radar device for detecting a target by transmitting a frequency-modulated signal and receiving a signal reflected from the target, comprising:
    means for mixing said transmission signal and said reception signal to obtain a beat signal;
    means for calculating a representative peak by grouping peak data in an up-beat and a down-beat, respectively;

pairing means for pairing the representative peaks in the respective grouped beats;

means for forecasting a representative peak position at this time in both of the up-beat and the down-beat from peak position data at the preceding time, to every target obtained by the pairing, and past-correspondence grouping means for carrying out the grouping in the up-beat and the down-beat in the vicinity of the forecast representative peak position at this time said pairing means carries out the pairing by using the representative peaks calculated by the past-correspondence grouping means to detect the target.

12. A radar device as defined by claim 11, wherein
the past-correspondence grouping means carries out the grouping of the peak data in the up-beat and the down-beat discretely in the frequency and angular directions, around the representative peak at this time, if any, forecast by the peak position forecasting means, and grouping of the remaining peak data thereafter.

13. A radar device as defined by claim 12, wherein
when the representative peak at this time is calculated by the past-correspondence grouping means in either one of the up-beat and the down-beat in the vicinity of the forecast position and a peak is detected in the vicinity of the forecast position in the other beat as well as a larger peak is detected at a position shifted in the angular or frequency direction, the past-correspondence means judges that a peak is not embedded in another target in one of the up-beat and the down-beat but is judged that a peak is embedded in an other target in the other of the up-beat and the down-beat.

14. A radar device as defined by claim 13, wherein
when a level of the peak in one of the up-beat and the down-beat shifted in the angular or frequency direction from the forecast position is larger than a level of the representative peak at this time in the vicinity of the forecast position in the other of the up-beat and the down-beat, the past-correspondence grouping means carries out the past-correspondence grouping process.

15. A radar device as defined by claim 13, wherein
the past-correspondence grouping means makes an angle or frequency of a peak to be calculated as the representative peak in the past-correspondence grouping process in one of the up-beat and the down-beat to be equal to the angle of the representative peak at this time which has already been calculated in the other of the up-beat and the down-beat wherein the target has judged to be not embedded.

16. A radar device as defined by claim 13, wherein
when the past-correspondence grouping means carries out the retrieval of a peak in one of the up-beat and the down-beat larger than the peak detected in the vicinity of the forecast position in the other of the up-beat and the down-beat, in the direction shifted in the frequency direction, the frequency retrieval range is changed in accordance with the difference in power between this peak and the representative peak calculated in the other of the up-beat and the down-beat.

17. A radar device as defined by claim 16, wherein
means for measuring a reflection level of the reflected signal is provided and when the reflection level of the reception signal in one of the up-beat and the down-beat is higher than the reflection level of the reception signal in the other of the up-beat and the down-beat, the past-correspondence grouping means carries out the past-correspondence grouping process.

18. A radar device as defined by claim 17, wherein
when an absolute value of the reflection level of a larger peak detected in the direction shifted in the frequency direction relative to a peak detected in the vicinity of the forecast position exceeds a predetermined threshold value, the past-correspondence grouping means carries out the past-correspondence grouping process.

19. A radar device as defined by claim 17, wherein
the past-correspondence grouping means makes an angle of the peak calculated as a representative peak in the past-correspondence grouping process in one of the up-beat and the down-beat to be equal to an angle of a representative peak calculated at this time in the other of the up-beat and the down-beat.

20. A radar device as defined by claim 17, wherein
the past-correspondence grouping means maintains an angle of the representative peak at the preceding time and uses as an angle of a peak to be calculated as a representative peak in the past-correspondence grouping process.

21. A radar device as defined by claim 12, wherein
when a peak having a smaller power corresponding to a representative peak at this time is detected in the vicinity of the forecast position in one of the up-beat and the down-beat by the past-correspondence grouping means, but no peak is detected in the vicinity of the forecast position in the other of the up-beat and the down-beat, the past-correspondence grouping means carries out a presumed grouping process for calculating a presumed representative peak at the same position in the other of the up-beat and the down-beat as that of a representative peak in one of the up-beat and the down-beat, and the pairing means carries out the pairing by using the representative peak and the presumed representative peak calculated by the past-correspondence grouping means.

22. A radar device as defined by claim 21, wherein
the past-correspondence grouping means carries out the presumed grouping process solely when the position of the peak having a small power is within a predetermined range at the front of the vehicle.

23. A radar device as defined by claim 21, wherein
the past-correspondence grouping means carries out the presumed grouping process when the position of the peak having a small power completely coincides with the forecast value at this time.

24. A radar device as defined by claim 12, wherein
when the representative peak at this time is calculated at a position completely coinciding with the forecast position in the beat in one of the up-beat and the down-beat by the past-correspondence grouping means, the pairing means carries out the pairing by solely using the completely coinciding peak in one of the up-beat and the down-beat at this time irrespective of the result of the grouping by the past-correspondence grouping means in the other of the up-beat and the down-beat.

25. A radar device as defined by claim 12, wherein
when there is the difference exceeding a reference value in the angular direction or the frequency direction between the representative peak at this time calculated in the vicinity of the forecast position in one of the up-beat and the down-beat and the representative peak at this time calculated in the vicinity of the forecast position in the other of the up-beat and the down-beat, the pairing means removes the both from the pairing objects.

26. A radar device as defined by claim 12, wherein
when the representative peak at this time is calculated in the vicinity of the forecast position in either one of the up-beat and the down-beat by the past-correspondence grouping means and a peak is detected at a position shifted from the forecast position in the angular or frequency direction in the other of the up-beat and the down-beat but not detected in the vicinity of the forecast position, the pairing means removes the representative peak in said one of the up-beat and the down-beat at this time from the pairing object.

27. A radar device as defined by claim 12, wherein
when the calculation of the representative peak at this time in the vicinity of the forecast position by the past-correspondence grouping means is interrupted, the past-correspondence grouping means repeats the calculation of the representative peak at this time in the vicinity of the forecast position a predetermined times.

28. A radar device as defined by claim 12, wherein
when the calculation of the representative peak at this time in the vicinity of the forecast position by the past-correspondence grouping means is interrupted, the past-correspondence grouping means calculates the representative peak at this time by widening a range in the vicinity of the forecast position in the angular or frequency direction in accordance with the length of the interrupted time.

29. A radar device as defined by claim 6, wherein the road side setting means sets the road side line by using a curve information of the road calculated by means for calculating a curve information of the curved road at the front of the host vehicle.

30. A radar device as defined by claim 14, wherein
the past-correspondence grouping means makes an angle or frequency of a peak to be calculated as the representative peak in the past-correspondence grouping process in one of the up-beat and the down-beat to be equal to the angle of the representative peak at this time which has already been calculated in the other of the up-beat and the down-beat wherein the target has judged to be not embedded.

31. A radar device as defined by claim 18, wherein
the past-correspondence grouping means makes an angle of the peak calculated as a representative peak in the past-correspondence grouping process in one of the up-beat and the down-beat to be equal to an angle of a representative peak calculated at this time in the other of the up-beat and the down-beat.

32. A radar device as defined by claim 18, wherein
the past-correspondence grouping means maintains an angle of the representative peak at the preceding time and uses as an angle of a peak to be calculated as a representative peak in the past-correspondence grouping process.

33. A radar device as defined by claim 27, wherein
when the calculation of the representative peak at this time in the vicinity of the forecast position by the past-correspondence grouping means is interrupted, the past-correspondence grouping means calculates the representative peak at this time by widening a range in the vicinity of the forecast position in the angular or frequency direction in accordance with the length of the interrupted time.

* * * * *